US006398263B2

(12) United States Patent
Treleaven et al.

(10) Patent No.: US 6,398,263 B2
(45) Date of Patent: *Jun. 4, 2002

(54) TAMPER EVIDENT RESEALABLE EXTENDED TEXT LABEL

(75) Inventors: Carl W. Treleaven, Greensboro, NC (US); Glenn A. Grosskopf, Lake Zurich, IL (US)

(73) Assignee: Pharmagraphics, (Southeast), L.L.C., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/779,327

(22) Filed: Feb. 8, 2001

Related U.S. Application Data

(63) Continuation-in-part of application No. 09/443,598, filed on Nov. 19, 1999, now Pat. No. 6,213,520.

(60) Provisional application No. 60/204,347, filed on May 15, 2000.

(51) Int. Cl.[7] .............................. B32B 3/00; G09F 3/00

(52) U.S. Cl. ........................... 283/81; 283/101; 229/74; 229/92.1; 229/92.3; 428/40.1; 40/306; 40/310; 40/312

(58) Field of Search .................. 283/81, 101; 229/92.1, 229/74, 92.3; 428/40.1; 40/306, 310, 312

(56) References Cited

U.S. PATENT DOCUMENTS

| | | | | |
|---|---|---|---|---|
| 4,534,582 A | | 8/1985 | Howard | 283/81 |
| 4,592,572 A | | 6/1986 | Instance | 281/2 |
| 4,621,442 A | | 11/1986 | Mack | 40/2 |
| 4,621,837 A | | 11/1986 | Mack | 283/105 |
| 4,711,686 A | | 12/1987 | Instance | 156/227 |
| 4,726,972 A | | 2/1988 | Instance | 428/40 |
| 4,744,161 A | | 5/1988 | Instance | 40/2 |
| 4,744,591 A | | 5/1988 | Instance | 281/5 |
| 4,747,618 A | | 5/1988 | Instance | 281/5 |
| 5,074,595 A | | 12/1991 | Hill et al. | 283/81 |
| 5,149,587 A | | 9/1992 | Hill et al. | 428/354 |
| 5,207,743 A | | 5/1993 | Jones | 283/81 |
| 5,263,743 A | | 11/1993 | Jones | 283/81 |
| 5,290,616 A | | 3/1994 | Cowan et al. | 428/40 |
| 5,439,721 A | | 8/1995 | Pedroli et al. | 428/40 |
| 5,449,538 A | | 9/1995 | Denny | 428/40 |
| 5,588,239 A | | 12/1996 | Anderson | 40/630 |
| 5,605,730 A | | 2/1997 | Treleaven | 428/40.1 |
| 5,727,819 A | | 3/1998 | Grosskopf et al. | 283/81 |
| 5,736,210 A | | 4/1998 | Treleaven | 428/40.1 |
| 5,738,382 A | | 4/1998 | Grosskopf et al. | 283/81 |
| 5,766,716 A | | 6/1998 | Barry | 428/40.1 |
| 5,829,789 A | | 11/1998 | Treleaven et al. | 283/81 |
| 5,830,550 A | | 11/1998 | Treleaven et al. | 428/40.1 |
| 5,863,628 A | | 1/1999 | Barry | 428/40.1 |
| 5,944,357 A | | 8/1999 | Instance | 283/101 |
| 5,972,455 A | | 10/1999 | Barry | 428/40.1 |
| 5,975,575 A | | 11/1999 | Instance | 281/2 |
| 5,975,582 A | | 11/1999 | Treleaven | 283/81 |
| 6,027,780 A | | 2/2000 | Treleaven et al. | 428/40.1 |
| 6,035,568 A | | 3/2000 | Grosskopf et al. | 40/630 |
| 6,082,777 A | | 7/2000 | Grosskopf et al. | 283/81 |
| 6,120,637 A | | 9/2000 | Barry | 156/252 |
| 6,213,520 B1 | * | 4/2001 | Treleaven et al. | 283/81 |
| 6,329,034 B1 | * | 12/2001 | Pendry et al. | 428/40.1 |

OTHER PUBLICATIONS

International Search Report for PCT/US00/41729.

* cited by examiner

*Primary Examiner*—A. L. Wellington
*Assistant Examiner*—Mark T. Henderson
(74) *Attorney, Agent, or Firm*—Myers Bigel Sibley & Sajovec

(57) ABSTRACT

A label includes a bottom panel and a top panel overlying the bottom panel. A tear line is formed in the top panel. A hole is formed in at least one of the top and bottom panels. An exposed adhesive is disposed in the hole. The label may be opened by tearing along the tear line and the label may be resealed using the exposed adhesive.

36 Claims, 14 Drawing Sheets

TAMPER EVIDENT RESEALABLE EXTENDED TEXT LABEL

RELATED APPLICATIONS

This is a continuation-in-part application of U.S. patent application Ser. No. 09/443,598, filed Nov. 19, 1999, is now U.S. Pat. No. 6,213,520 the disclosure of which is incorporated herein by reference in its entirety. This application claims the benefit of U.S. Provisional Application Ser. No. 60/204,347, filed May 15, 2000, the disclosure of which is incorporated herein by reference in its entirety.

FIELD OF THE INVENTION

The present invention is directed to extended text labels, and, more particularly, to resealable multi-panel labels for pharmaceutical and like uses and methods for forming the same.

BACKGROUND OF THE INVENTION

In the packaging of certain chemicals and pharmaceuticals, the manufacturer is often required or desires to provide a considerable amount of information concerning the chemical or pharmaceutical. In the case of pharmaceuticals, this is required by government regulations, however, the occasion may also arise, either separate from or in conjunction with government regulations, to provide the doctor, pharmacist or user with instructions on how the product should be used, what the product is, and safety precautions which should be followed in the use of the product. Similarly, it is often desirable to provide information in multiple languages so that a given product or packaging may be distributed in multiple locations or regions.

Sometimes the literature, which is generally in the form of folded leaflets, is placed within a box along with the container carrying the chemical or pharmaceutical (referred to as "inserts"). The placement of leaflets within the box is expensive and a cumbersome operation to perform. Also, it is difficult to insure by later inspection that the proper literature has been inserted in the proper package. Most all products are packaged in outer cartons and many are not compatible with inserts. Further, the use of folded cartons is under scrutiny by environmental groups, as involving excessive packaging. In an effort to meet this challenge, many companies are looking at ways to eliminate folding cartons that carry containers inside.

A different approach to solving this problem has developed over the last several years in which the folded literature is releasably attached to the face of the container (referred to as "outserts"), either directly to the container itself, or to a base label which, in turn, is secured to the container. The literature may then be removed by the customer. In such cases, the portion of the label remaining must carry both an "identification" of the product, for example, information such as trademark, manufacturer, etc., as well as certain "statutory information" (for example, lot number and expiration date).

Thus, in order to meet the objectives of such labeling techniques, certain criteria must be met. First of all, the portion of the label which remains after the folded literature product is removed must contain both the identification of the product, as well as the statutory information concerning the lot number and expiration date. Further, after the literature leaflet is assembled or affixed to the base label, the indicated area for statutory information concerning lot number and expiration date must be accessible for stamping or printing by the pharmaceutical company and visible to the consumer in addition to the identification of the product. The folded leaflet portion remains affixed to the label portion until the customer (doctor, pharmacist, consumer) desires its removal. It is critical that the proper literature must be affixed to the proper base label. Finally, all of the above criteria must be accomplished in a manufacturing technique that insures quality and is cost-effective.

Examples of labels designed to eliminate the separate base panel are disclosed in U.S. Pat. No. 5,290,616 to Cowan (hereinafter, "Cowan") and in U.S. Pat. Nos. 5,207,746 and 5,263,743, each to Jones (hereinafter, "Jones '746" and "Jones '743", respectively), for example.

It is often desirable to provide an extended text label with resealability. Resealability may allow the user to open the label, inspect or remove the interior pages thereof, and thereafter reclose and reseal the label. The interior pages, if not removed, may then be referred to again later. Additionally, the various panels of the label are retained in a closed configuration so that they do not dangle and interfere with the handling of and detract from the appearance of the associated article.

In many applications, it is also desirable to be able to determine if the label has already been opened. For example, it may be desirable to provide means for indicating whether the label has been tampered with.

SUMMARY OF THE INVENTION

According to a first aspect of the present invention, a label includes a bottom panel and a top panel overlying the bottom panel. A tear line is formed in the top panel. A hole is formed in at least one of the top and bottom panels. An exposed adhesive is disposed in the hole. The label may be opened by tearing along the tear line and the label may be resealed using the exposed adhesive.

The label may include a base adhesive coating a lower surface of the bottom panel such that the bottom panel may be directly adhered to an article by the base adhesive. A release coating may be provided on one of the top and bottom panels and positioned to releasably engage the exposed adhesive. The label may include a laminate cover overlying the top panel, and a laminate adhesive securing the laminate cover to the top panel. The label may include a second tear line formed in the bottom panel adjacent the first tear line. The top panel may be joined to the bottom panel along a fold.

The label may include: a laminate cover overlying the top panel; and a laminate adhesive securing the laminate cover to the top panel, the exposed adhesive forming a part of the laminate adhesive; wherein the hole is formed in the top panel and the exposed adhesive releasably engages an upper surface of the bottom panel.

Alternatively, the label may include: an interior panel disposed between the top and bottom panels, the interior panel having an upper surface facing the top panel; a laminate cover overlying the top panel; and a laminate adhesive securing the laminate cover to the top panel, the exposed adhesive forming a part of the laminate adhesive; wherein the hole is formed in the top panel and the exposed adhesive releasably engages an upper surface of the interior panel.

Alternatively, the label may include: a base adhesive coating a lower surface of the bottom panel, the exposed adhesive forming a part of the base adhesive; wherein the hole is formed in the bottom panel and the exposed adhesive releasably engages a lower surface of the top panel.

Alternatively, the label may include: a first hole defined in the bottom panel; a second hole defined in the top panel and overlying the first hole; a laminate cover overlying the top panel; and a laminate adhesive securing the laminate cover to the top panel, the exposed adhesive forming a part of the laminate adhesive; wherein the exposed adhesive is disposed adjacent each of the first and second holes.

The label may include: a laminate cover overlying the top panel; a laminate adhesive securing the laminate cover to the top panel; a tab disposed adjacent the bottom panel and separately formed from the top and bottom panels; and a tab adhesive coating a lower surface of the tab, the laminate cover being secured to an upper surface of the tab by the laminate adhesive.

According to a further aspect of the invention, a label includes a leaflet including a bottom panel and a top panel overlying the bottom panel. A first hole is defined in the bottom panel. A second hole is defined in the top panel and overlies the first hole. A laminate cover overlies the top panel. A laminate adhesive secures the laminate cover to the top panel. An exposed portion of the laminate adhesive is disposed adjacent the first and second holes. The exposed portion of the laminate adhesive may be directly engaged with the article through the first and second holes.

According to a further aspect of the invention, a label includes a leaflet including a bottom panel and a top panel overlying and joined to the bottom panel along a fold. A first tear line is formed in the top panel and a second tear line is formed in the bottom panel. The first and second tear lines are disposed adjacent the fold and define a first leaflet portion on one side thereof and a second leaflet portion on an opposing side thereof. The fold forms a part of the second leaflet portion. A first adhesive is operable to secure the first leaflet portion to the article at a first location. A second adhesive is operable to secure the second leaflet portion to the article at a second location.

According to a further aspect of the invention, a label assembly includes a release liner and a label. The label includes a bottom panel and a top panel overlying the bottom panel. The top panel has a lower surface facing the bottom panel. The bottom panel has a lower surface. A hole is defined in the bottom panel and underlies the top panel. A base adhesive coats the lower surface of the bottom panel. The base adhesive directly and releasably secures the bottom panel to the release liner. An exposed portion of the base adhesive is disposed adjacent the hole. The exposed portion of the base adhesive may be releasably engaged with the lower surface of the top panel through the hole.

According to a further aspect of the invention, a label includes a unitary leaflet including a bottom panel and a top panel overlying and joined to the bottom panel along a fold. The bottom panel has an upper surface facing the top panel. A hole is defined in the top panel and overlies the bottom panel. A laminate cover overlies the top panel. A laminate adhesive secures the laminate cover to the top panel. An exposed portion of the laminate adhesive is disposed adjacent the hole. The exposed portion of the laminate adhesive may be releasably engaged with the upper surface of the bottom panel through the hole.

According to a further aspect of the invention, a label includes a bottom panel and a top panel overlying the bottom panel. The top panel includes an extended flap extending therefrom and beyond an edge of the bottom panel. A base adhesive patch coats a lower surface of the bottom panel. A flap adhesive patch coats a lower surface of the extended flap. An adhesive-free gap is defined between the base adhesive patch and the flap adhesive patch. At least a portion of the adhesive-free gap underlies the extended flap. A tear line is formed in the extended flap of the top panel and overlies the adhesive-free gap. A hole is formed in at least one of the top and bottom panels. An exposed adhesive is disposed in the hole. The label may be opened by tearing along the tear line and the label may be resealed using the exposed adhesive.

According to a further aspect of the invention, a label includes a bottom panel and a top panel overlying the bottom panel. The top panel includes an extended flap extending therefrom and beyond an edge of the bottom panel. A base adhesive coats a lower surface of the bottom panel and a lower surface of the extended flap. A release portion of the base adhesive underlies the extended flap. The release portion is coated with at least one of an adhesive deadener and a varnish. A tear line is formed in the extended flap of the top panel and overlies the release portion. A hole is formed in at least one of the top and bottom panels. An exposed adhesive is disposed in the hole. The label may be opened by tearing along the tear line and the label may be resealed using the exposed adhesive.

Objects of the present invention will be appreciated by those of ordinary skill in the art from a reading of the Figures and the detailed description of the preferred embodiments which follow, such description being merely illustrative of the present invention.

DETAILED DESCRIPTION OF THE PREFERRED EMBODIMENTS

Figure 1A:
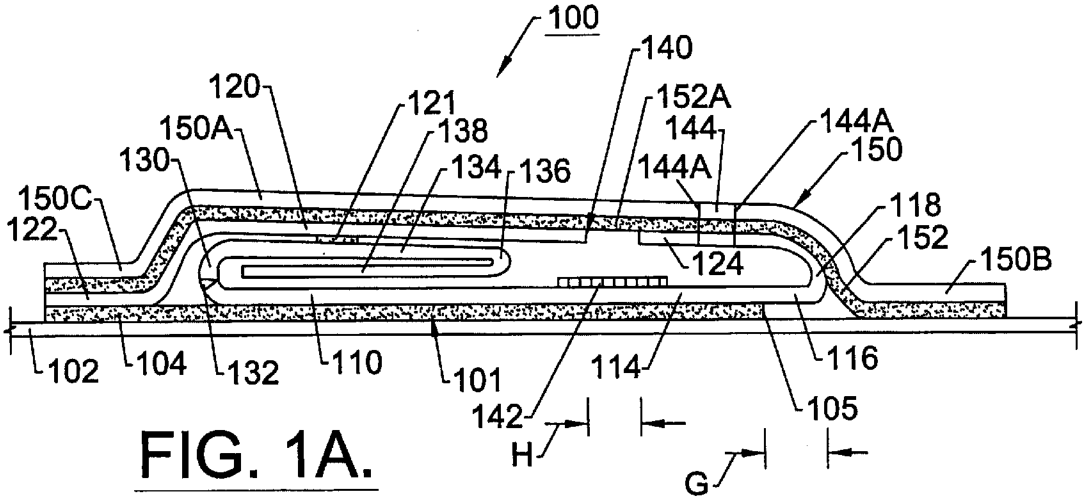
FIG. 1A is a side elevational view of a label according to a first embodiment of the present invention disposed on a release liner and in an initial closed position.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The thicknesses of layers of the labels as shown in the drawings may be exaggerated for clarity.

With reference to FIGS. 1A–1C and 2, a label 100 according to the present invention is shown therein disposed on a release liner 102. The label 100 generally includes a unitary folded leaflet 101, an adhesive patch 104, and a laminate cover 150. The laminate cover 150 is adhered to the leaflet 101 by a laminate adhesive 152. The label 100 is releasably adhered to the release liner 102 by the adhesive 104 and a portion of the laminate adhesive 152. When the label 100 is removed from the release liner 102, the adhesive 104 and the adhesive 152 remain with the label 100 and may be used to secure the label 100 to an article (not shown).

The leaflet 101 includes a bottom panel 110 and a top panel 120 joined along a fold 118. An interior panel 134 is joined to the bottom panel 110 along a fold 130. A further interior panel 138 is joined to the panel 134 along a fold 136. A tear line 132 is formed along or adjacent the fold 136. An extended flap 122 forming a part of the top panel 120 extends beyond the fold 130. The bottom panel includes a portion 114 disposed beneath the top panel 120 and coated on its underside by the adhesive 104. The bottom panel 110 further includes a portion 116 which extends beyond the edge 105 of the adhesive 104. Preferably, the portion 116 extends a distance G beyond the edge 105. With reference FIG. 2, suitable indicia 107, 109 may be printed on the top panel 120. Further indicia (not shown) may be printed on any of the remaining panels of the leaflet 101. The leaflet is preferably formed of paper or polymeric film.

A main portion 150A of the laminate cover 150 is adhered to the main portion of the top panel 120. An edge portion 150B of the laminate cover 150 extends beyond the fold 118 and is directly adhered to the release liner by the adhesive 152. An opposed edge portion 150C extends beyond the fold 130 and is adhered to the extended flap 122. Preferably, the adhesive 152 permanently adheres the laminate cover 150 to the top panel 120. The laminate cover 150 is preferably formed of a 1.5 mil polypropylene film.

An adhesive dot or patch 121 temporarily secures the inner surface of the top panel 120 to the upper surface of the panel 134. Corresponding adhesive dots or patches may be similarly provided in the various embodiments described below, but are not shown.

A hole 140 is formed in the top panel 120. Preferably, and as shown, the hole 140 extends the full width of the top panel 120, thereby severing the top panel 120 into two pieces (as shown in FIG. 1A, a left side piece and a shorter right side piece). Alternatively, the hole 140 may be shortened such that portions of the top panel 120 extend alongside the hole 140 (e.g., on either side of the hole 140). A release coating 142, preferably a release varnish, coats the upper surface of the base panel portion 114 beneath the hole 140. Suitable release varnishes include product number L075 available from Paragon Inks of Boxburn, Scotland, UK. A portion 152A of the laminate adhesive 152 is thereby exposed through the hole 140 and placed in contact with the release varnish 142. Note that, while the adhesive 152A and the varnish 142 are shown separated for clarity, the adhesive 152A preferably engages the release varnish 142 in the finished label 100 prior to opening. The laminate adhesive 152A is a pressure-sensitive adhesive which releasably adheres to the release varnish 142. Suitable laminate adhesives include product No. 517, 1.5 mil polypropylene with a 0.6 mil layer of adhesive available from Adhesive Coated Products of Troy, Ohio. Spaced apart tear lines 144A are formed through the laminate cover 150, the adhesive 152 and the top panel 120. The tear lines 144A are preferably lines of perforations. The tear lines 144A define a tear strip 144 therebetween.

The hole 140 preferably has a width dimension H (see FIG. 1A) of at least ⅛ inch. Preferably, the corresponding width of the release varnish 142 is at least ⅛ inch greater than the width H.

Figure 1B:
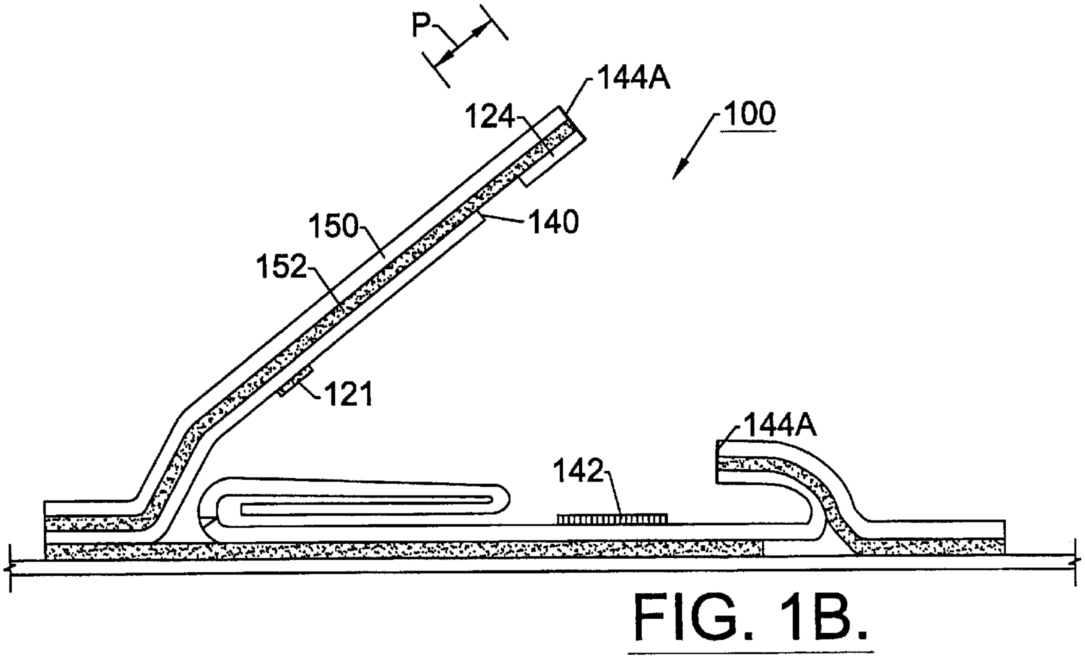
FIG. 1B is a side elevational view of the label of FIG. 1A in an open position.
Figure 1C:
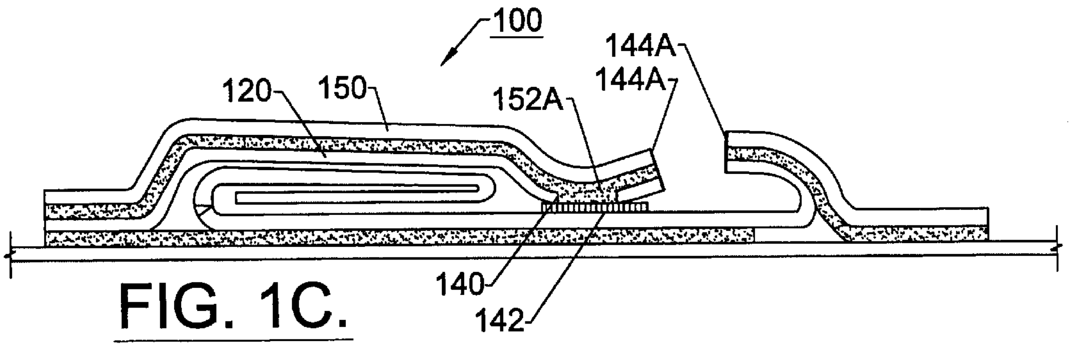
FIG. 1C is a side elevational view of the label of FIG. 1A in a reclosed, resealed position.
Figure 2:
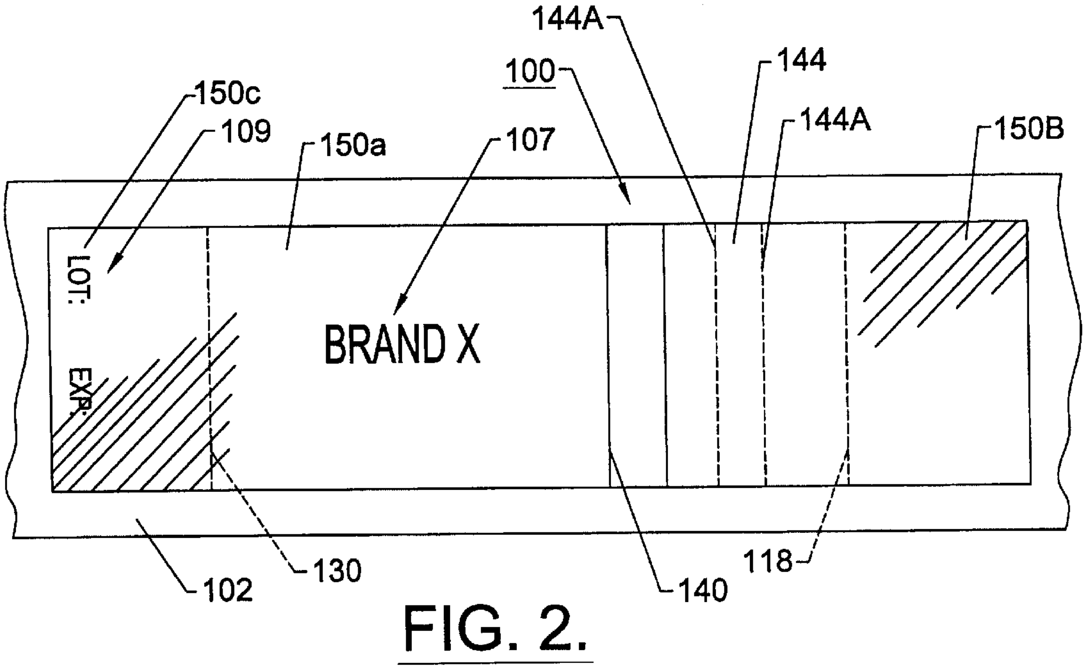
FIG. 2 is a top plan view of the label of FIG. 1A disposed on the release liner.

The label 100 may be used in the following manner. As discussed above, the label 100 is secured to an article by means of the adhesive 104 and the adhesive 152 underlying the laminate cover portion 150B. When the user desires to access the information on the bottom and interior panels of the label, the user may remove the strip 144. The user then may lift the laminate cover 150 and the top panel 120 away from the bottom panel as shown in FIG. 1B, thereby peeling the adhesive 152A away from the release varnish 142, to place the label in an open position. The interior and bottom panels may then be accessed. If desired, the user may remove the interior panels 134, 138 by tearing along the tear line 132. The user may then reseal the label 100 by folding the top panel back down and re-engaging the adhesive 152A with the release varnish 142 as shown in FIG. 1C.

From the foregoing description, it will be appreciated that the label provides multiple desirable features in an extended text label. The tear strip 144 provides for convenient opening as well as tamper evidence. Once the tear strip 144 has been removed, it cannot be replaced and its absence serves as notice to subsequent observers/users that the label 100 has been opened. Notably, after the tear strip 144 is removed, the spacing between the hole 140 and the adjacent tear line 144A provides a free portion or pull tab 124 of the top panel 120 (as well as the adhered portion of the laminate cover 150) which the user may securely grasp to lift the top panel 120. The pull tab 124 preferably has a width P of between about ⅛ inch and $^{3}/_{16}$ inch.

The hole 140, the adhesive 152A and the varnish 142 serve as described above as a means to reseal the top panel 120 in the closed position. Preferably, the adhesive 152A and the varnish 142 are selected to allow repeated separation and resealing. The adhesive 152A and the varnish 142 also serve, prior to the opening of the label 100, to assist the adhesive 121 in maintaining the top panel 120 and the bottom 110 in their desired relative positions.

Figure 3:
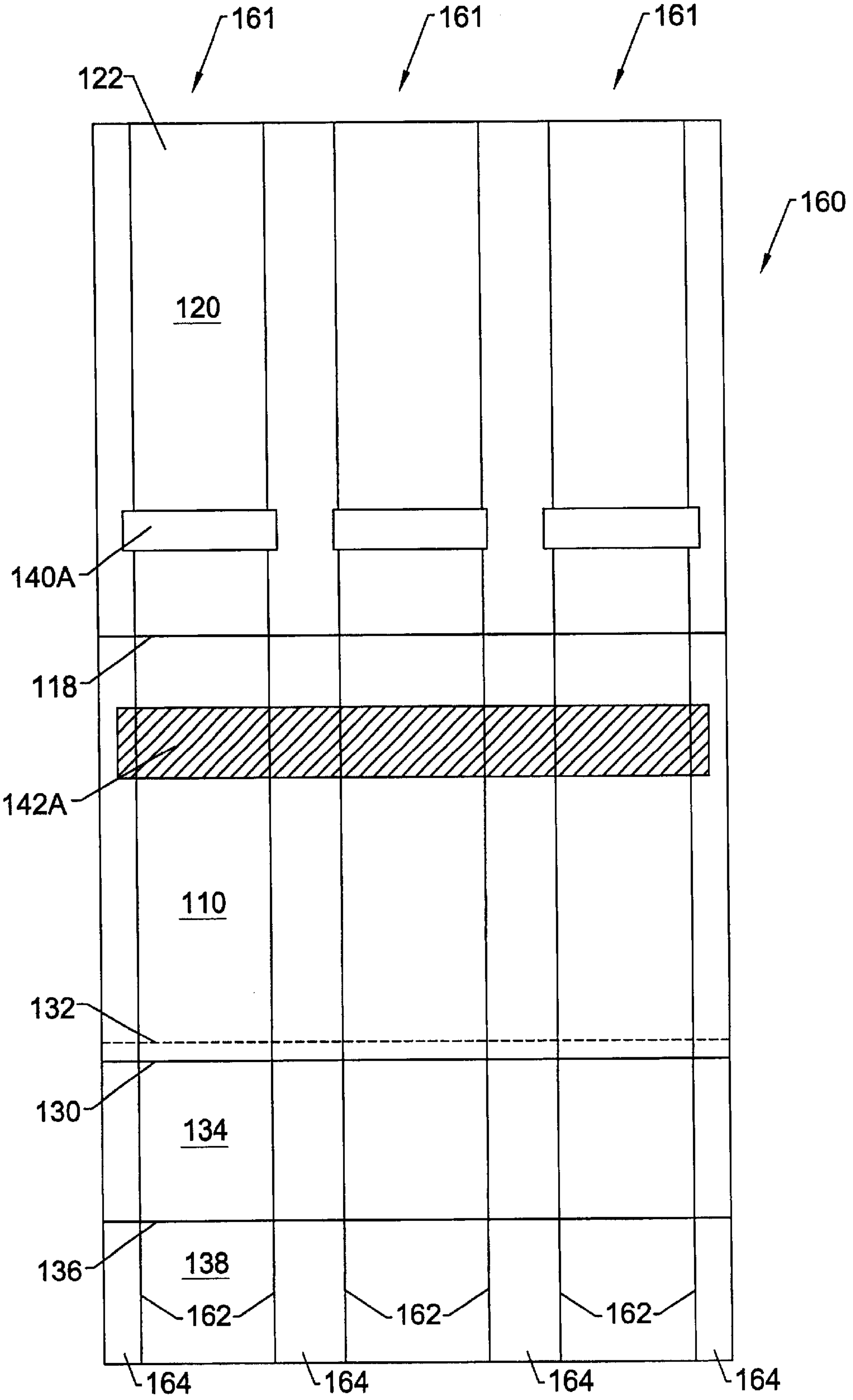
FIG. 3 is a top plan view of a label blank for forming a leaflet of the label of FIG. 1A.

The label 100 may be formed using the following method. With reference to FIG. 3, a leaflet sheet or blank 160 for forming a multiple-up leaflet 101A (see FIGS. 4 and 6) is shown therein. The leaflet 101 may be formed from the multiple-up the leaflet 101A. The leaflet blank 160 includes side by side sections 161. The sections 161 are similarly formed and only one will be described hereinafter. The numerals 162 designate cut lines (as discussed hereinafter) and the side edges of the finished leaflet 101. The sections 161 from which the leaflets 101 are formed are flanked on either side by waste portions 164. The blank 160 may be individual sheet printed, printed on a sheet-fed offset press, or printed on and cut from a web. For clarity, the indicia on the various panels is not shown.

Prior to folding, a release varnish strip 142A corresponding to the release varnish 142 is printed on the blank 160. The tear line 132 and a hole 140A corresponding to the hole 140 are formed by one or more die cuts.

Figure 4:
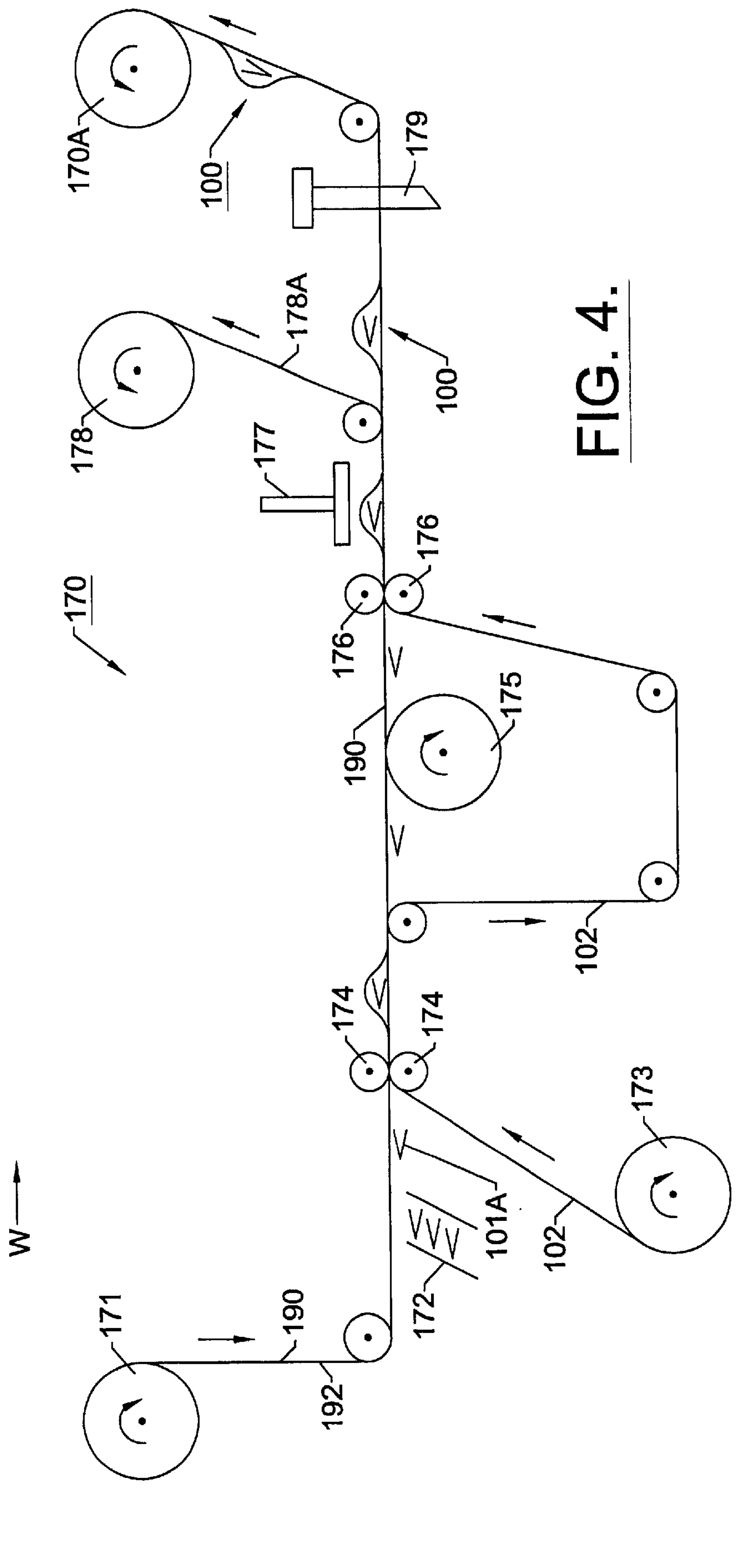
FIG. 4 is a schematic diagram of an apparatus for forming the label of FIG. 1A.
Figure 6:
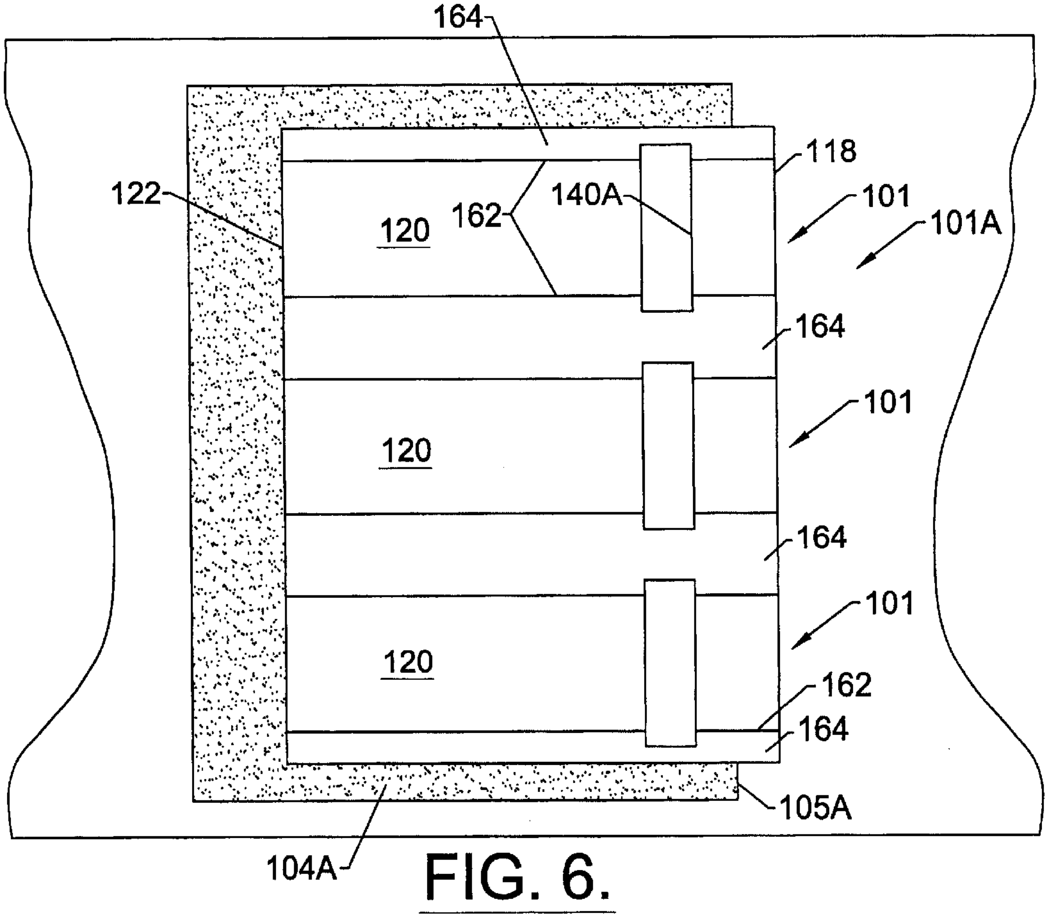
FIG. 6 is a top plan view of a multiple-up leaflet for forming the label of FIG. 1A disposed on a release liner.

After the blank 160 has been constructed as shown in FIG. 3, it may be folded to form the multiple-up leaflet 101A (see FIGS. 4 and 6). The blank 160 may be folded on a conventional roll or sheet-fed folder. The panel 138 is folded onto the panel 134 about the fold line 136. The panel 138 and the panel 134 are folded onto the bottom panel 110 about the fold line 130. The top panel 120 is folded onto the bottom panel 110 about the fold line 118. The multiple-of leaflet 101A will then have the same configuration, as viewed from the side, as the leaflet 101.

The label 100 may be formed using one of two alternative methods and apparatus as described hereafter. According to a first method and using an apparatus 170 as shown in FIG. 4, a self-adhesive web 190 is unwound from an unwinding station 171 and travels generally in the direction W as indicated. The web 190 corresponds to the laminate cover 150 (see FIG. 1) and includes a pressure-sensitive adhesive 192 corresponding to the adhesive 152 (see FIG. 1). The multiple-up leaflet 101A is supplied or fed to the adhesive-coated surface of laminate web 190 by a leaflet applicator 172. Suitable leaflet applicators include an Onserter 750 available from Onserts, Inc.-Longford Equipment of Toronto, Canada. The top panel 120 of the leaflet 101A (including the extended flap) adheres to the underside of the laminate web 190 by means of the adhesive 192. The release liner 102 is unwound from an unwind stand 173 and married to the laminate web 190 at niprollers 174 whereby the leaflet 101A is forced into secure contact with the laminate web 190 and the adhesive 192.

The release liner 102 is delaminated from the laminate web 190 and the leaflet 101A, again exposing the bottom panel 110A of the leaflet 101A. The leaflet 101A then passes by an adhesive applicator 175. Preferably, the adhesive applicator 175 is a flexographic adhesive printer. Preferably, the flexographic adhesive printer includes an adhesive pattern applicator of the type adapted to be mounted on a flexo-printing press or converting line to apply hot-melt pressure sensitive adhesives. Suitable flexographic adhesive printers include a FlexoCoat PrintCoat Pattern Applicator, model number HM410, available from Flexocoat International, Inc. The adhesive applicator 175 applies a strip of adhesive corresponding to the adhesive 104 (see FIG. 1) to the bottom panel of the leaflet 101A. The adhesive applicator applies the adhesive to only a portion of the bottom panel so that a gap corresponding to the adhesive-free gap underlying the bottom panel portion 116 (see FIG. 1) remains. Preferably, registry between the adhesive and the bottom panel of the leaflet 101A is assured by integrating the flexographic adhesive printer into the press drive train.

The release liner 102 is remarried to the laminate web 190 and the leaflet 101A by nip rollers 176. Following the nip rollers 176, the laminate web 190 is releasably adhered to the silicone coated upper surface of the release liner 102 by the adhesive 192, and the leaflet 101A is releasably adhered to the upper surface of the release liner by the adhesive from the adhesive applicator 175.

A die cut station 177 forms the cut lines 144A as well as cut lines down to the release liner 102 to define individual leaflets 101 and labels 100. Optionally, these cut lines may be formed by different die cutters.

A waste matrix 178A including portions of the laminate web 190, the adhesives and the multiple-up leaflets 101A not defined within the labels 100 are removed by a winding station 178. Optionally, the release liner 102 is slit by a knife 179 to form separate, side-by-side longitudinal webs which are wound onto rolls at a winding station 170A. The cutting step includes cutting along the cut lines 162 (see FIG. 3). The waste removal step includes removing the waste portions 164 (see FIG. 3).

Figure 5:
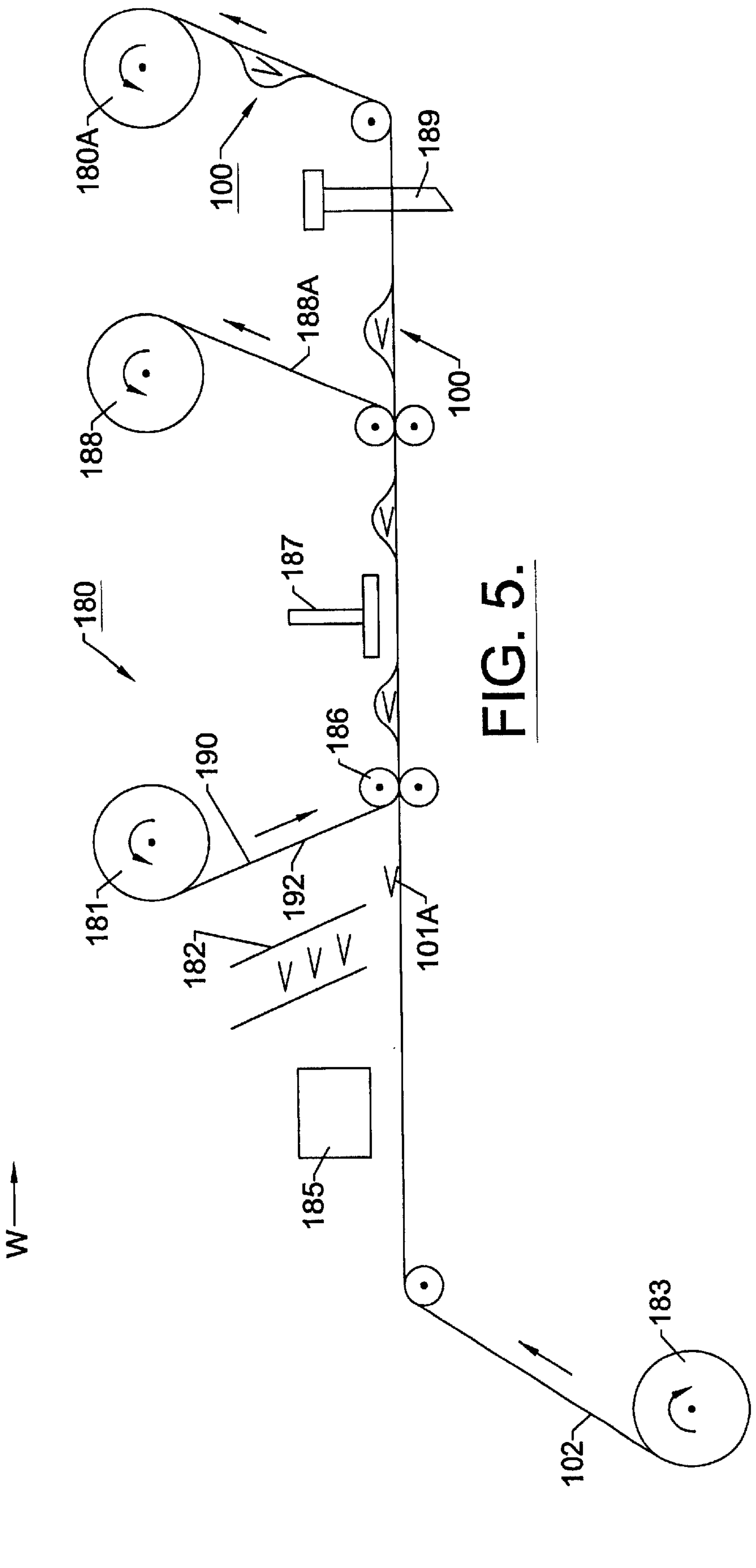
FIG. 5 is a schematic diagram of an alternative apparatus for forming the label of FIG. 1A.

Alternatively, with reference to FIG. 5, an apparatus 180 may be used to form the label 100. The release liner is provided from an unwinding station 183. An adhesive patch 104A (see FIG. 6) is printed on the silicone coated upper surface of the release liner 102 by a print station 185. The adhesive station 185 is preferably a flexographic adhesive printer as described above for the applicator 175. Alternatively, the adhesive station 185 may be an adhesive screen printer, for example a rotary screen coating system available from Nordson Corporation of Amherst, Ohio. The adhesive patch 104A corresponds generally to the adhesive layer 104 of the finished label 100. The multiple up leaflet 101A is supplied to the upper surface of the release liner 102 and to the adhesive patch 104A by a leaflet applicator station 182 (preferably of the same type as described above). As shown in FIG. 6, the multiple-up leaflet 101A is applied to the adhesive patch 104A such that the end fold 118 of the leaflet 101A extends beyond the adjacent edge 105A of the adhesive patch 104A.

Thereafter, a self-adhesive laminate web 190 having an adhesive coating 192 on its lower surface is supplied by an unwinding station 181. The web 190 is married to the release liner 102 by nip rollers 186. A die cutter 187 (or separate die cutters) forms the tear lines 144A and the peripheries of the labels 100 which are formed from the multiple up leaflet 101A. The waste matrix 188A is removed by a winding station 188 leaving the finished label 100 on the release liner 102. Optionally, the release liner 102 may be longitudinally slit by a knife 189. The release liner and the label 100 thereon are taken up on a winding stand 180A.

Figure 7:
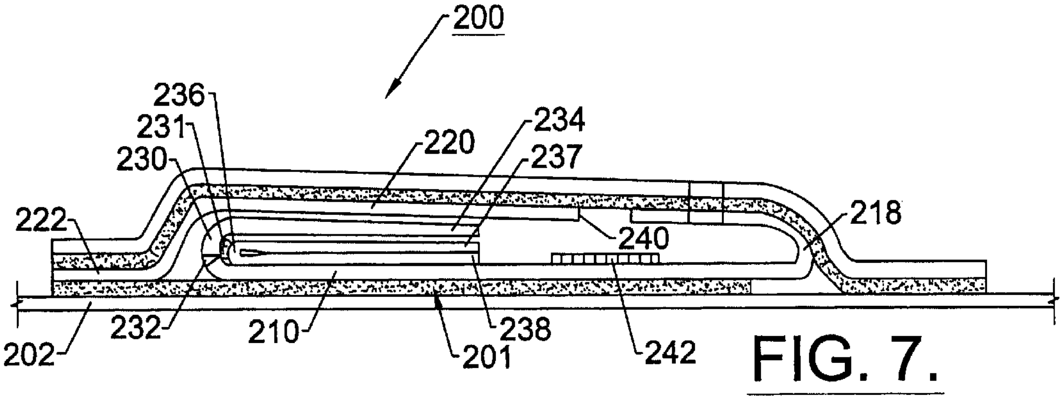
FIG. 7 is a side elevational view of a label according to a further embodiment of the present invention disposed on a release liner.

With reference to FIG. 7, a label 200 according to a further embodiment is shown therein mounted on a release liner 202. The label 200 differs from the label 100 only in the construction of the leaflet 201.

The leaflet 201 includes a top panel 210 joined to a bottom panel 220 along a fold line 218. A strip of release varnish 242 is disposed on the upper surface of the bottom panel 210 and a hole 240 is formed in the top panel 220. An interior panel 234 is connected to the bottom panel 210 along a fold 230. A tear line 232 is formed on or adjacent the fold 230. A separate piece including interior panels 237 and 238, which are connected along a fold 236, are positioned between the panel 234 and the bottom panel 210. The panels 237, 238 are connected to the remainder of the leaflet 201 by a strip of glue 231 which joins the outer portion of the fold 236 with the inner portion of the fold 230. An extended flap 222 of the top panel 220 extends beyond the fold 230.

Figure 8:
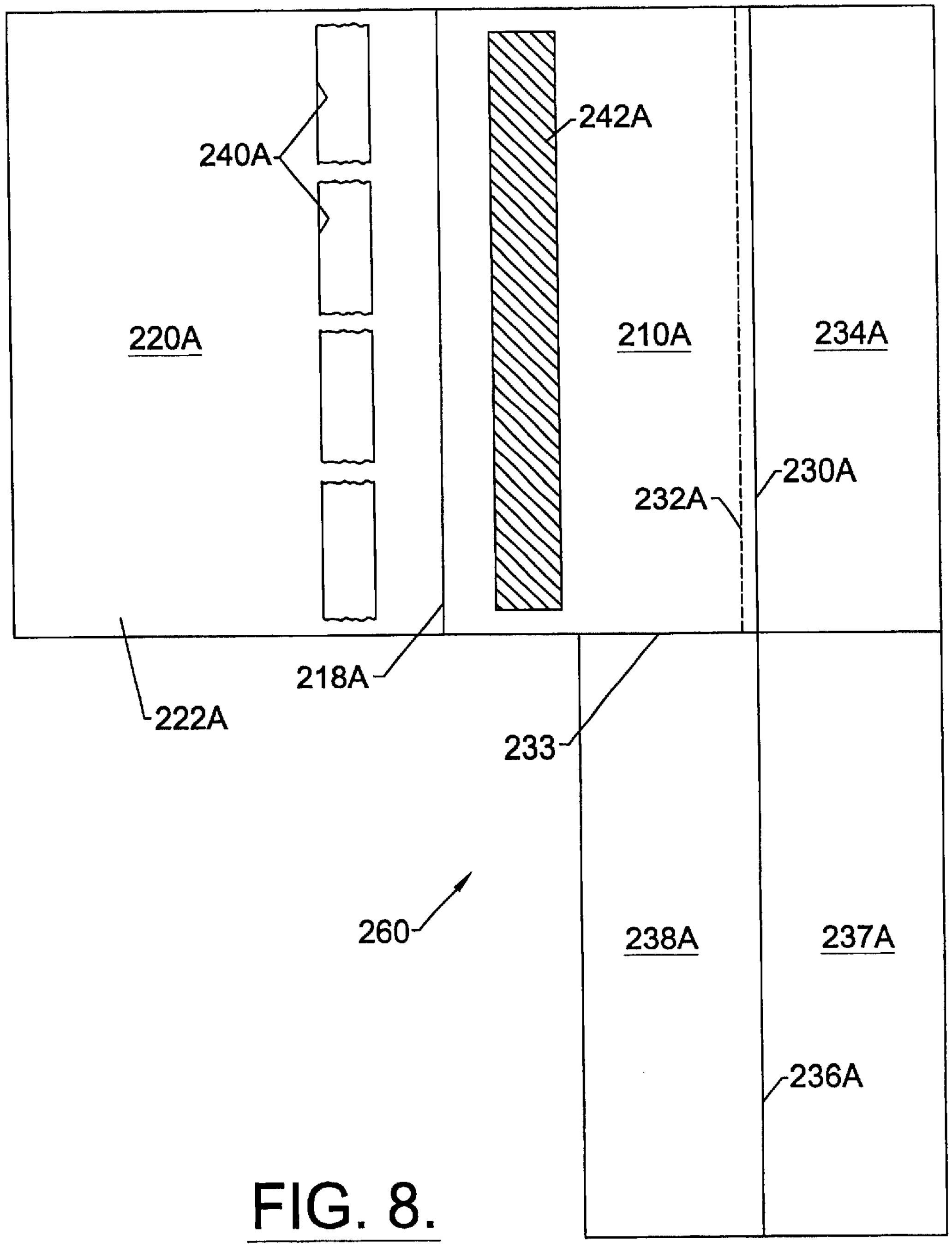
FIG. 8 is a top plan view of a label blank for forming the label of FIG. 7.

With reference to FIG. 8, a leaflet blank 260 for forming the leaflet 201 is shown therein. The blank 260 is configured to form a multiple-up leaflet from which four side-by-side leaflets 201 may be formed. Lines indicating the cut lines between the respective leaflets and the waste portions are not shown in FIG. 8 but will be apparent to those of ordinary skill in the art upon a reading of this and the foregoing descriptions. The leaflet blank 260 may be formed in the same manner as described above for the leaflet blank 160. During the formation step, a strip of release varnish 242A corresponding to the release varnish 242 is printed on the panel 210A, and holes 240A corresponding to the hole 240 and a cut line 232A corresponding to the cut line 232 are formed in the blank 260.

The label blank 260 may be folded as follows to form a multiple-up leaflet from which the leaflet 201 may be formed. Panels 238A and 237A are folded onto panels 210A and 234A, respectively, about a fold line 233. The panels 234A and 237A are folded onto the panels 210A and 238A about the fold line 236A and a fold line 230A. A panel 220A is then folded onto the panel 210A about a fold line 218A. An extended flap portion 222A will then extend beyond the fold 230A. The multiple-up leaflet so formed may be used to form the label 200 using either of the methods described above with regard to the label 100.

Figure 9:
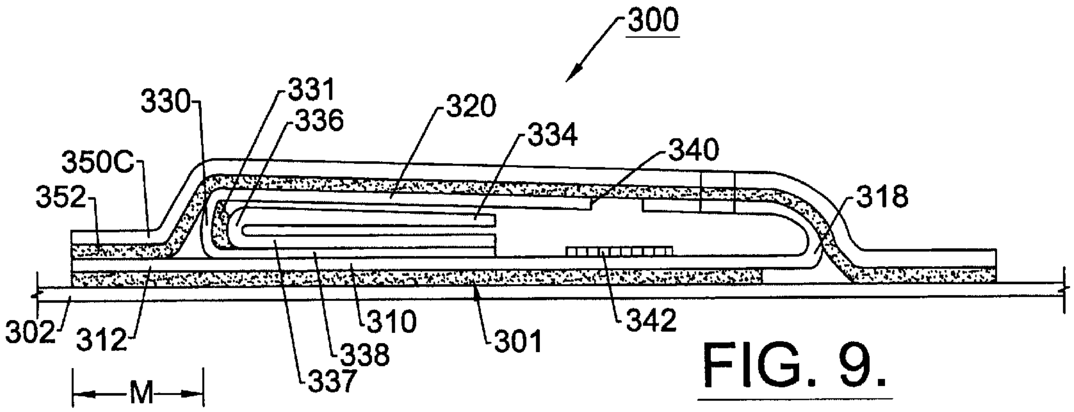
FIG. 9 is a side elevational view of a label according to a further embodiment of the present invention disposed on a release liner.

With reference to FIG. 9, a label 300 according to a further embodiment is shown therein mounted on a release liner 302. The label 300 is the same as the label 100 except for the construction of the leaflet 301. The leaflet 301 includes a bottom panel 310 connected to a top panel 320 along a fold line 318. An interior panel 338 is connected to the top panel 320 along a fold line 330. Further interior panels 334 and 337, which are joined to one another along a fold line 338, are secured between the top panel 320 and the panel 338 by a glue strip 331 which joins the outer surface of the fold 336 with the inner surface of the fold 330. A hole 340 is formed in the top panel 320 and a strip of release varnish 342 is printed on the upper surface of the bottom panel 310. The bottom panel 310 includes an extended flap 312 which extends beyond the fold 330. Preferably, the extended flap 312 extends beyond the fold 330A distance M of between about ⅝ inch and 1 inch. A laminate cover portion 350C is permanently secured to the upper surface of the extended flap 312 by the laminate adhesive 352. From the foregoing description, methods for using the label 300 will be apparent to those of ordinary skill in the art.

Figure 10:
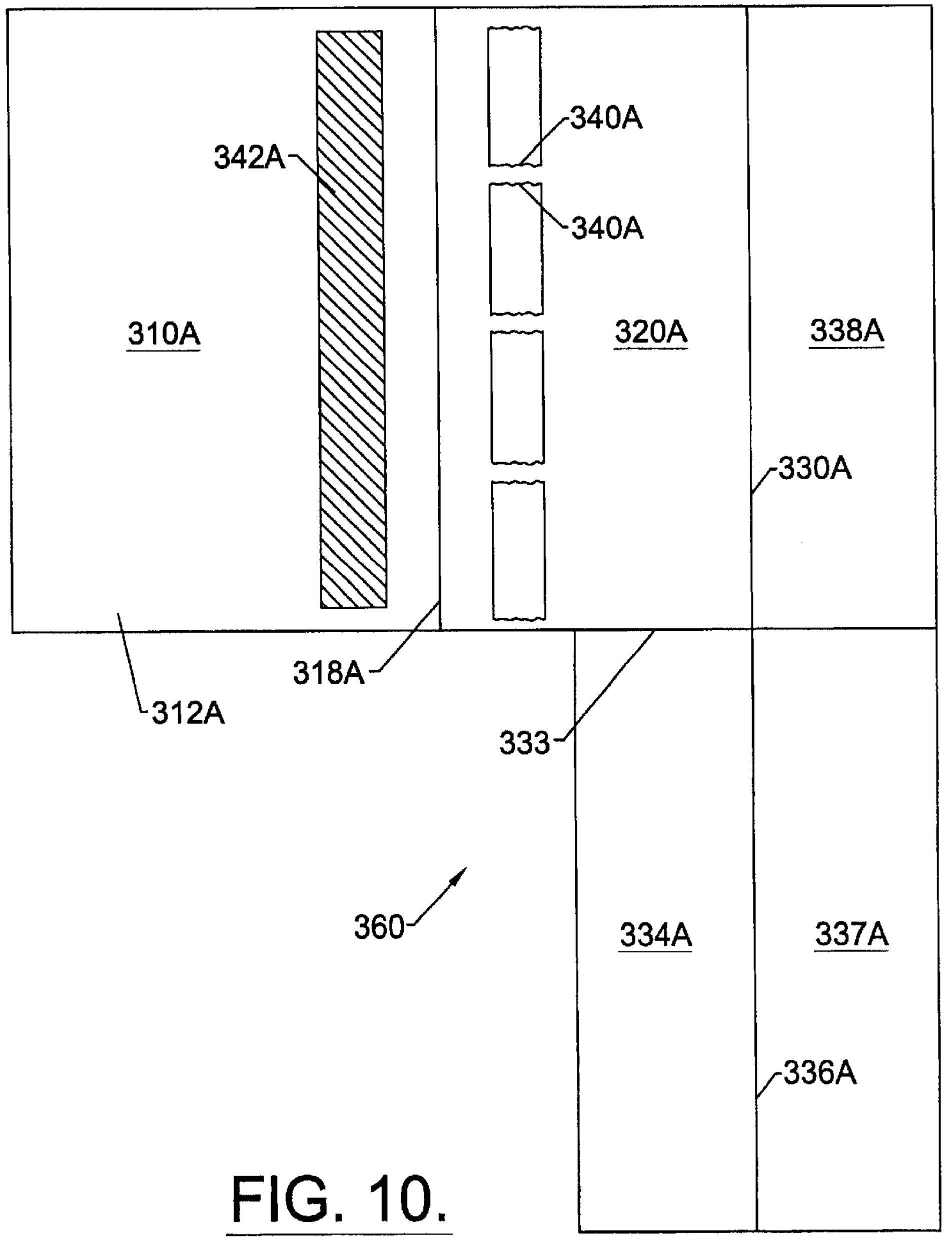
FIG. 10 is a top plan view of a label blank for forming the label of FIG. 9.

With reference to FIG. 10, the leaflet 301 may be formed using a leaflet blank 360 as shown therein. The blank 360 may be formed in the same manner as described above for the leaflet blank 160. Preferably, a release varnish strip 342A is printed on the blank 360 and holes 340A are cut into the leaflet blank 360 prior to folding. The blank 360 is folded as follows. Panels 334A and 337A are folded about a fold line 333 onto panels 320A and 338A, respectively. The panels 337A and 338A are folded about fold lines 330A and 336A onto panels 320A and 334A. Thereafter, the panel 320A is folded onto a panel 310A about a fold line 318A. An extended flap portion 312A of the panel 310A will then extend beyond the fold 330A. Similar to the leaflet blank 260, the leaflet blank 360 is adapted to form a multiple-up leaflet for forming four side-by-side leaflets 301. Lines indicating the separations between the respective leaflets and the waste portions are omitted for clarity. The multiple-up leaflet so formed may be used to form the label 300 using either of the methods described above.

Figure 11:
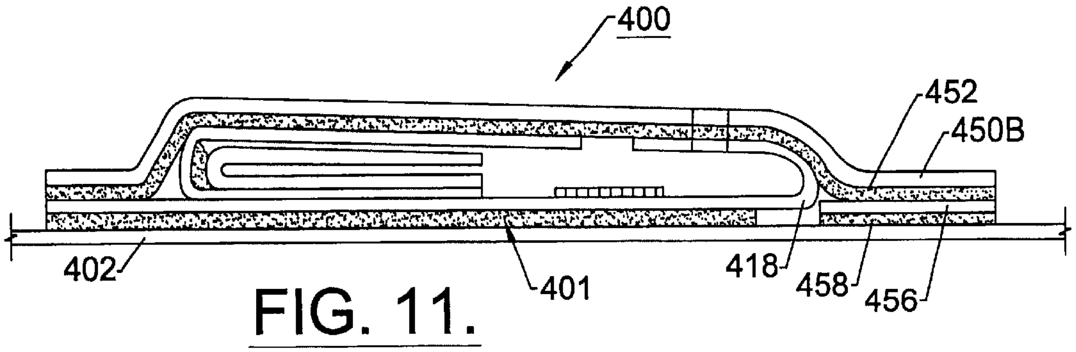
FIG. 11 is a side elevational view of a label according to a further embodiment of the present invention disposed on a release liner.

With reference to FIG. 11, a label 400 according to a further embodiment of the present invention is shown therein mounted on a release liner 402. The label 400 corresponds to the label 300 except for the additional provision of a separate tab 456. The tab 456 is releasably secured to the release liner 402 by adhesive 458. A laminate cover portion 450B is permanently secured to the upper surface of the tab 456 by the laminate adhesive 452. Preferably, the tab 456 is positioned immediately adjacent the hole 418. However, the tab 456 may be spaced apart from the hole 418 or a portion of the tab 456 may underlie the leaflet 401. The tab is preferably formed of the same material as the leaflet 100. Suitable means and methods for forming the label 400 will be apparent to those of ordinary skill in the art from the description herein and co-pending application Ser. No. 09/232,553, filed Jan. 18, 1999, the disclosure of which is hereby incorporated herein in its entirety.

Figure 12:
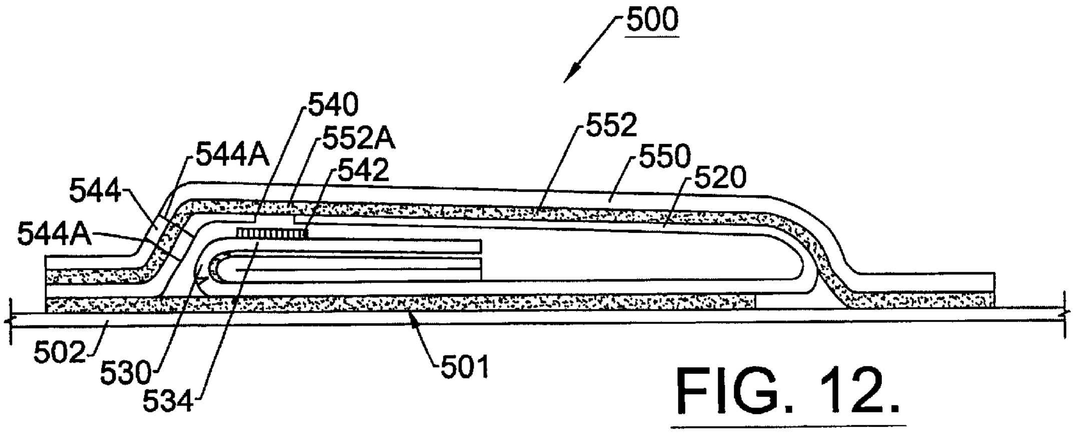
FIG. 12 is a side elevational view of a label according to a further embodiment of the present invention disposed on a release liner.

With reference to FIG. 12, a label 500 according to a further embodiment of the present invention is shown therein mounted on a release liner 502. The label 500 includes a leaflet 501 which corresponds to the leaflet 201. The label 500 differs from the label 200 in that the release varnish strip 542 is disposed on the upper surface of the interior panel 534 and the hole 540 in the top panel 520 is located over the release varnish strip 542. Additionally, the tear strip 544 (defined between the tear lines 544A) is relocated to a position adjacent the fold 530. It will be appreciated that the label 500 may be modified to include multi-folded leaflet style interior panels, such as in the leaflet 101, rather than the booklet style of the leaflet 501.

The label 500 may be used in the following manner. The user may pull away the tear strip 544 and pull the top panel 520 and the laminate cover 550 away, thereby peeling the portion 552 of the laminate adhesive 552 away from the varnish 542, to reveal the interior and bottom panels of the leaflet 501. The user may inspect and/or remove portions of the leaflet 501 and then close and reseal the label by rejoining the adhesive 552A and the release varnish 542.

Figure 13:
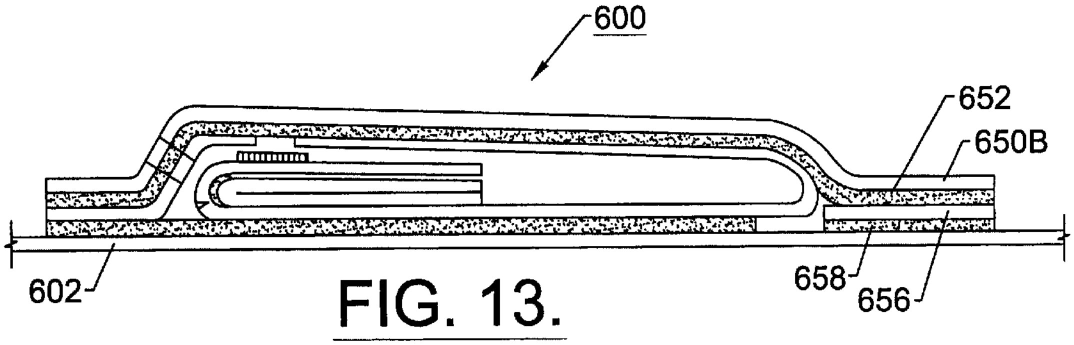
FIG. 13 is a side elevational view of a label according to a further embodiment of the present invention disposed on a release liner.

With reference to FIG. 13, a label 600 according to a further embodiment is shown therein mounted on a release liner 602. The label 600 corresponds to the label 500 except for the additional provision of a separate tab 656. The tab 656 is releasably adhered to the release liner 658. A laminate cover portion 650B is permanently adhered to the upper surface of the tab 656 by the laminate adhesive 652. Means and methods for forming the label 600 will be readily apparent from the description herein.

Figure 14:
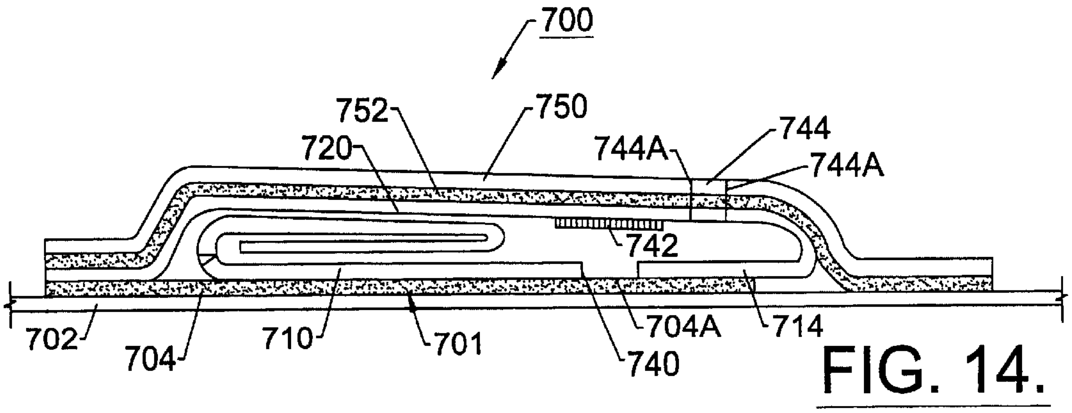
FIG. 14 is a side elevational view of a label according to a further embodiment of the present invention disposed on a release liner.

With reference to FIG. 14, a label 700 according to a further embodiment is shown therein mounted on a release liner 702. The label 700 includes a leaflet 701 corresponding to the leaflet 101 except that the hole 740 is formed in the portion 714 of the bottom panel 710. The release varnish 742 is relocated to the lower surface of the top panel 720. The tear strip 744 (defined between the tear lines 744A) is positioned in the same location as in the label 100. Notably, the laminate adhesive 752 of the laminate cover 750 does not engage the bottom panel 710. Rather, a portion 704A of the base adhesive 704 is exposed through the hole 740 and releasably engages the release varnish 742.

The label 700 may be used in the same manner as described above with regard to the label 100. Suitable modifications to the means and methods described above for forming the label 100 will be readily apparent to those of ordinary skill in the art upon a reading of the description herein.

Figure 15:
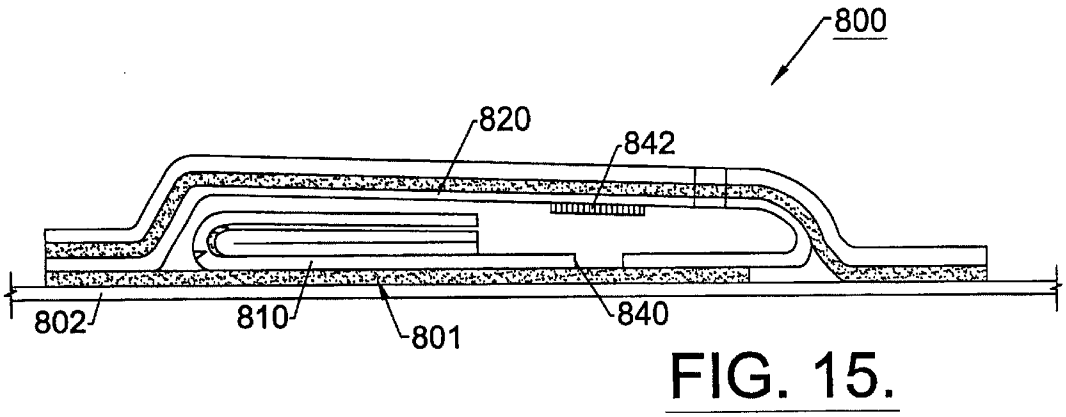
FIG. 15 is a side elevational view of a label according to a further embodiment of the present invention disposed on a release liner.

With reference to FIG. 15, a label 800 according to a further embodiment is shown therein mounted on a release liner 802. The label 800 includes a leaflet 801 corresponding to the leaflet 201 except that, in the same manner as in the label 700, the release varnish 842 coats the lower surface of the top panel 820 and the hole 840 is formed in the bottom panel 810.

Figure 16:
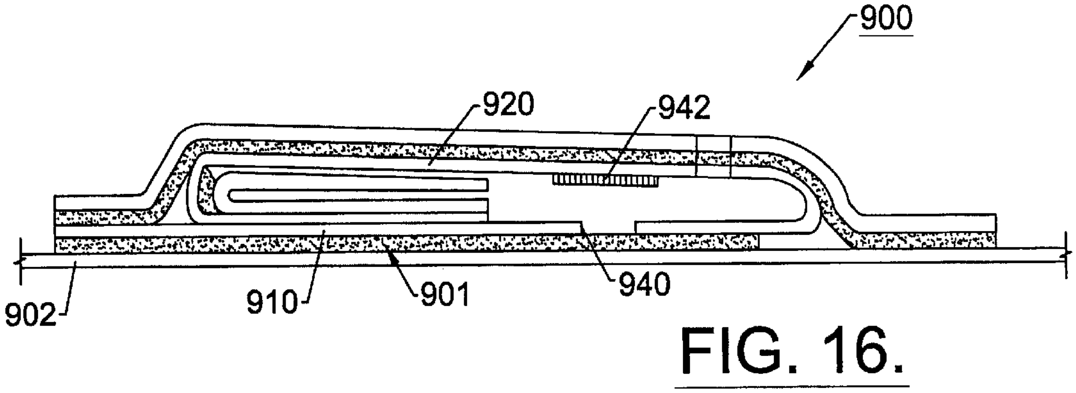
FIG. 16 is a side elevational view of a label according to a further embodiment of the present invention disposed on a release liner.

With reference to FIG. 16, a label 900 according to a further embodiment is shown therein mounted on a release liner 902. The label 900 includes a leaflet 901 corresponding to the leaflet 301 except that, as in the label 700, the release varnish 942 coats the lower surface of the top panel 920 and the hole 940 is formed in the bottom panel 910.

Figure 17:
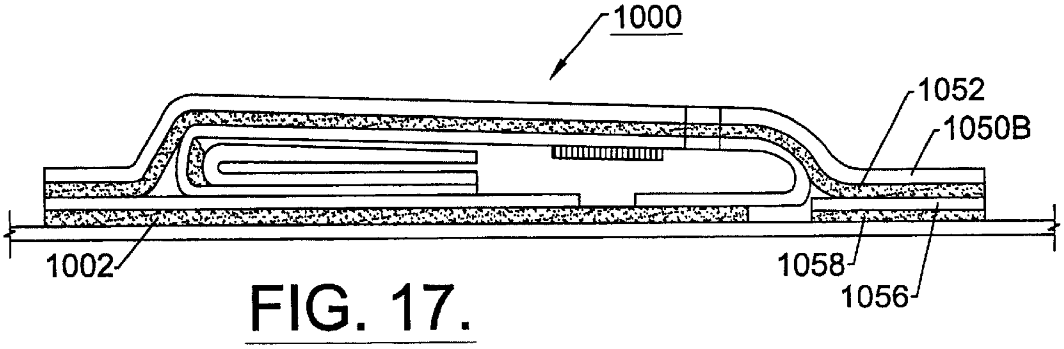
FIG. 17 is a side elevational view of a label according to a further embodiment of the present invention disposed on a release liner.

With reference to FIG. 17, a label 1000 according to a further embodiment is shown therein mounted on a release liner 1002. The label 1000 is the same as the label 900 except for the additional provision of a separate tab 1056. The tab 1056 is releasably adhered to the release liner 1002 by an adhesive 1058. A laminate cover portion 1050B is permanently adhered to the upper surface of the tab 1056 by the laminate adhesive 1052.

Figure 18:
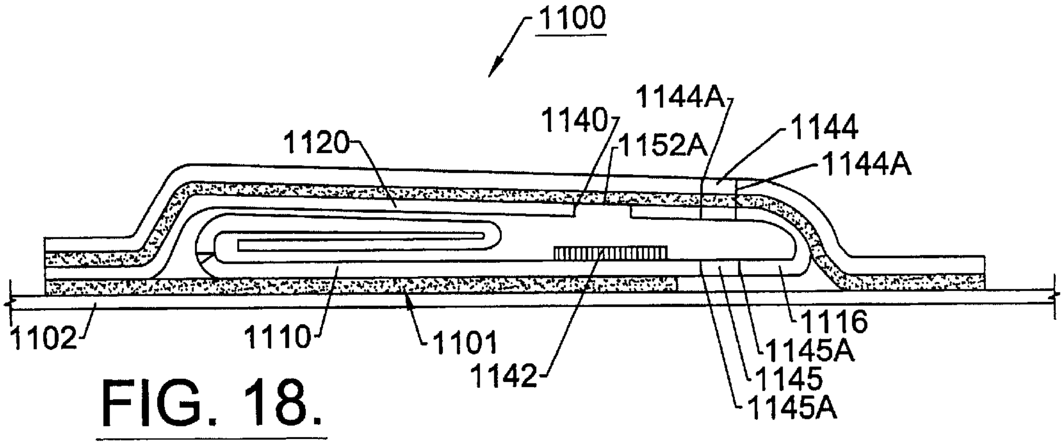
FIG. 18 is a side elevational view of a label according to a further embodiment of the present invention disposed on a release liner.

With reference to FIG. 18, a label 1100 according to a further embodiment is shown therein mounted on a release liner 1102. The label 1100 includes a leaflet 1101 corresponding to the leaflet 101 except for the provision of a tear strip 1145 (defined between tear lines 1145A) in the portion 1116 of the bottom panel 1110. The tear lines 1145 are extensions of and co-extensive with the tear lines 1144A which define the tear strip 1144.

Figure 19:
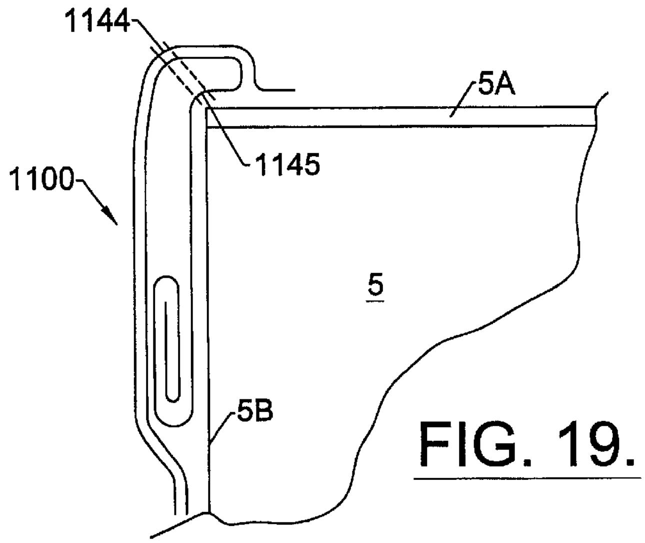
FIG. 19 is a schematic view of the label of FIG. 18 mounted on a container.

With reference to FIGS. 18 and 19, the label 1100 may be mounted on a container 5 having a separable lid 5A as shown. The label 1100 is mounted such that a portion of the label is permanently adhered to one wall 5B of the container 5, and another portion of the label 1100 is permanently secured to the lid 5A. More particularly, the tear strips 1144 and 1145 are disposed along the edge where the lid 5A meets the wall 5B. In use, the user may lift the lid 5A away from the wall 5B, thereby tearing the tear lines 1144A and 1145A (see FIG. 18). In this way, the label 1100 will provide clear evidence that the lid 5A has been opened. Optionally, the user may remove the tear strip 1144 without opening the lid 5A. In either case, the user may then lift the top panel 1120 away, thereby separating the laminate adhesive portion 1152A exposed through the hole 1140 from the release varnish 1142 to access the interior and bottom panels of the label 1100. Thereafter, the user may reclose and reseal the label 1100 by rejoining the adhesive 1152A with the release varnish 1142.

Figure 20:
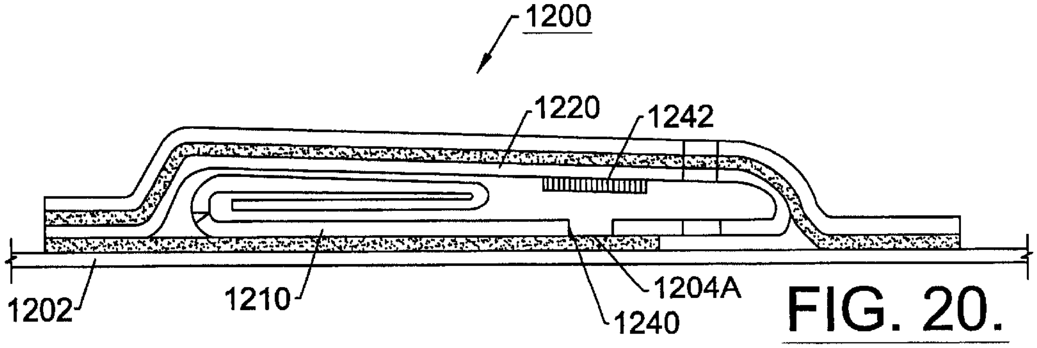
FIG. 20 is a side elevational view of a label according to a further embodiment of the present invention disposed on a release liner.

With reference to FIG. 20, a label 1200, according to a further embodiment is shown therein mounted on a release liner 1202. The label 1200 is the same as the label 1100 except that the release varnish is located on the lower surface of the top panel 1220 and the hole 1240 is located in the bottom panel 1210. The release varnish 1242 and the adhesive portion 1204A may be used to reseal the label 1200 in the same manner as described above with regard to the label 700, for example.

Figure 21:
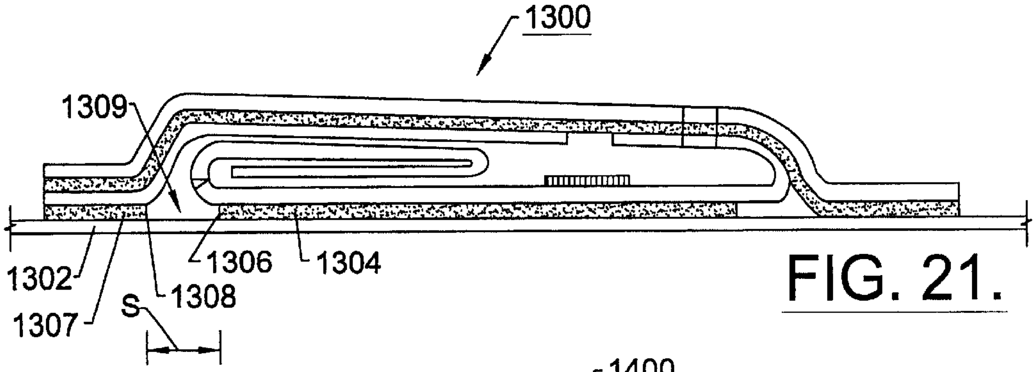
FIG. 21 is a side elevational view of a label according to a further embodiment of the present invention disposed on a release liner.

With reference to FIG. 21, a label 1300 according to a further embodiment is shown therein mounted on a release liner 1302. The label 1300 is the same as the label 100 except for the additional provision of an adhesive gap 1309. The adhesive gap 1309 is defined between the edge 1306 of the adhesive patch 1304 and the edge 1308 of an adhesive strip 1307. Preferably, the adhesive gap 1309 has a length S of between about 3/16 inch and 1/4 inch. The provision of the adhesive gap 1309 aids in preventing bunching or binding of the label 1300 as it is applied to a round container beginning with either end.

Figure 22:
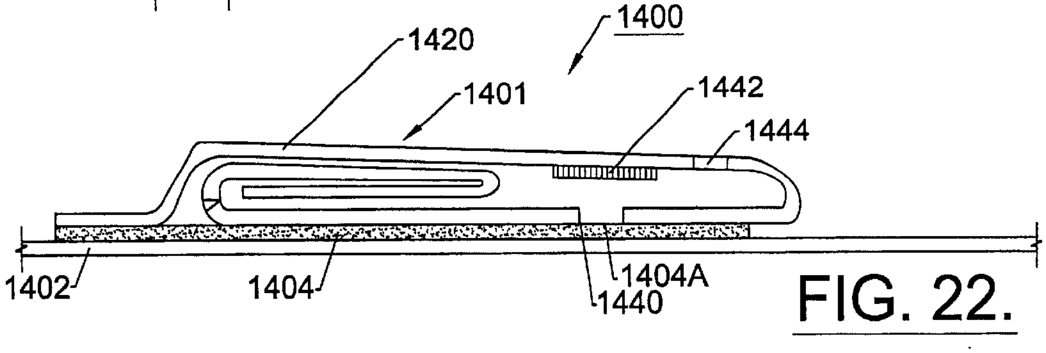
FIG. 22 is a side elevational view of a label according to a further embodiment of the present invention disposed on a release liner.

With reference to FIG. 22, a label 1400 according to a further embodiment is shown therein disposed on a release liner 1402. The label 1400 includes a leaflet 1401 corresponding to the leaflet 701. The leaflet 1401 is secured to the release liner 1402 by an adhesive patch 1404 corresponding to the adhesive patch 704. The label 1400 differs from the label 700 in that no laminate cover or laminate adhesive are provided.

The label 1400 may be used in substantially the same manner as the label 700. The user may open the label 1400 by removing the tear strip 1444 and pulling the top panel 1420 away, thereby peeling the release varnish 1442 away from the adhesive portion 1404A which is exposed through the hole 1440. The top panel 1420 may thereafter be resealed by re-engaging the release varnish 1442 and the adhesive 1404A.

Figure 23:
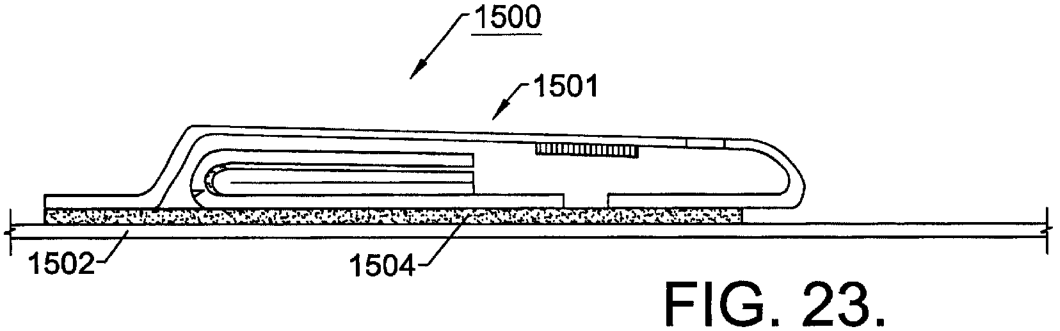
FIG. 23 is a side elevational view of a label according to a further embodiment of the present invention disposed on a release liner.

With reference to FIG. 23, a label 1500 according to a further embodiment is shown therein mounted on a release liner 1502. The label 1500 includes a leaflet 1501 corresponding to the leaflet 801 and secured to the release liner 1502 by an adhesive patch 1504.

Figure 24:
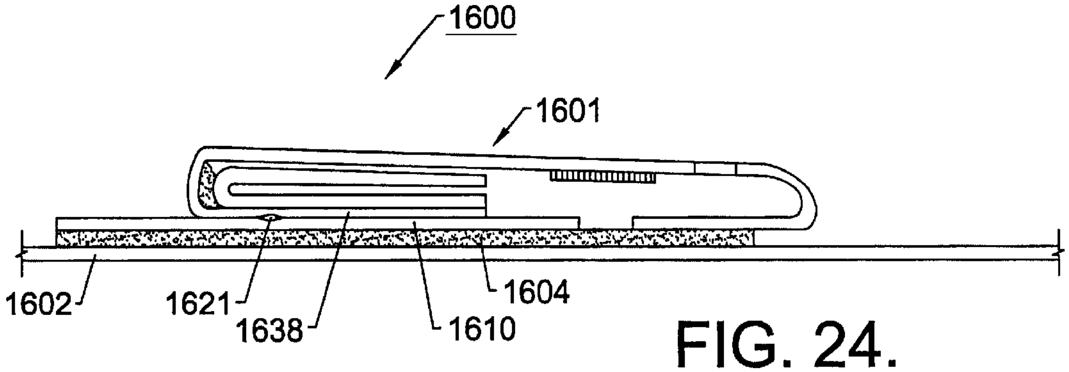
FIG. 24 is a side elevational view of a label according to a further embodiment of the present invention disposed on a release liner.

With reference to FIG. 24, a label 1600 according to a further embodiment is shown therein mounted on a release liner 1602. The label 1600 includes a leaflet 1601 corresponding to the leaflet 901. The leaflet 1601 is releasably adhered to the release liner 1602 by an adhesive patch 1604. An adhesive dot, patch or strip 1621 temporarily secures the interior panel 1638 to the bottom panel 1610.

Figure 25:
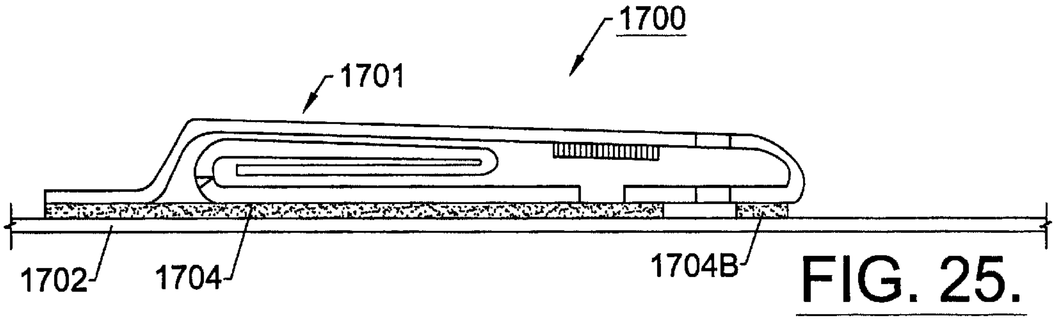
FIG. 25 is a side elevational view of a label according to a further embodiment of the present invention disposed on a release liner.

With reference to FIG. 25, a label 1700 according to a further embodiment is shown therein mounted on a release liner 1702. The label 1700 includes a leaflet 1701 corresponding to the leaflet 1201. The leaflet 1701 is releasably secured to the release liner 1702 by an adhesive patch 1704 and a second adhesive patch 1704B. Alternatively (not shown), the adhesive patch 1704 may extend to and include the adhesive 1704B.

Methods for manufacturing and using the labels 1400, 1500, 1600, 1700 will be readily apparent to those of ordinary skill in the art upon a reading of the foregoing description.

In each of the foregoing labels, the resealing adhesive (e.g., the adhesive 152A, the adhesive 552A or the adhesive 704A) and the material of the opposing leaflet panel (e.g., the panel 110, the panel 534 or the panel 720) may be selected to allow releasability and resealability. If the labels are modified in this manner, the varnish (e.g., the varnish 142, the varnish 542 or the varnish 742) may be omitted. However, the provision of the varnish strip is preferred because it allows for selection of the adhesive and the leaflet material independently.

Figure 26:
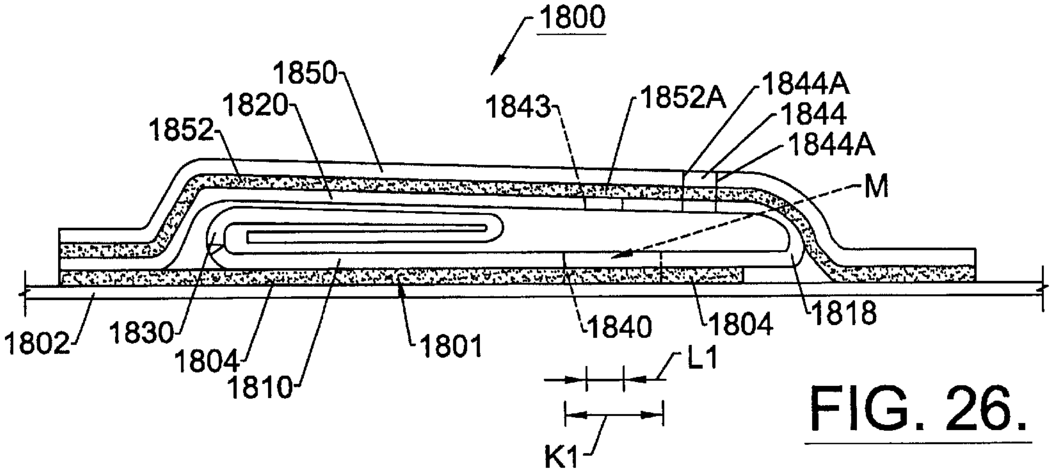
FIG. 26 is a side elevational view of a label according to a further embodiment of the present invention disposed on a release liner.
Figure 27:
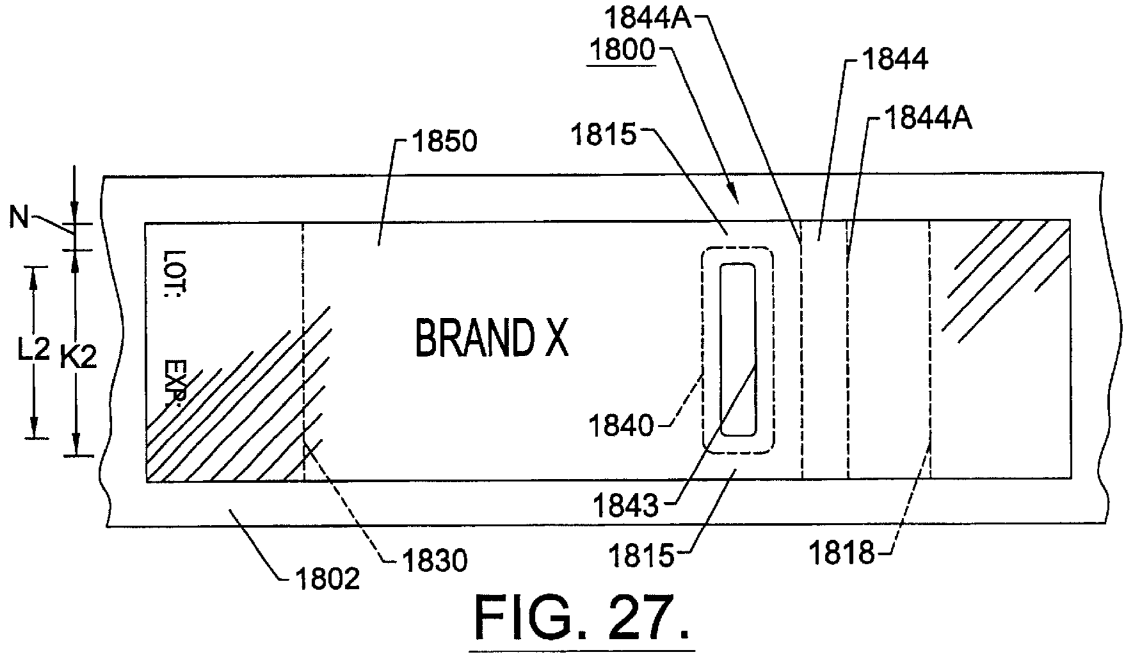
FIG. 27 is a top plan view of the label of FIG. 26 disposed on the release liner.

With reference to FIGS. 26 and 27, a label 1800 according to a further embodiment of the present invention is shown therein disposed on a release liner 1802. The label 1800 corresponds to the label 700 except as follows. The leaflet 1801, which otherwise corresponds to the leaflet 701, includes a hole 1843 in the top panel 1820 and a larger hole 1840 in the bottom panel 1810. Preferably, as shown, side strips 1815 connect the portions of the bottom panel 1810 on either side of the hole 1840. Preferably, each side strip 1815 has a width N of at least ⅛ inch. Alternatively, the hole 1840 may extend the full width of the bottom panel 1810. Preferably, the hole 1843 has a width L1 of at least 3/16 inch, and the hole 1840 has a width K1 at least 3/16 inch greater than the width L1 and a length K2 at least 3/16 inch greater than the length L2 of the hole 1843. The base adhesive patch 1804 is formed with a gap M, preferably having the same dimensions as the hole 1840. The leaflet 1801 has folds 1830 and 1818. Tear lines 1844A are formed in the laminate cover 1850 and the top panel 1820 and define a tear strip 1844 therebetween.

Preferably, though shown separated in the drawing for clarity, the portion 1852A of the laminate adhesive 1852 extends through the hole 1843 and the hole 1840 to engage the release liner 1802 and thereby releasably secure the laminate cover 1850 thereto. When the label 1800 is applied to an associated article, the adhesive portion 1852A engages the surface of the article. The adhesive 1852 is selected such that it may be peeled away from the article. Preferably, the adhesive 1852 is selected such that the laminate cover 1850 (and the top panel 1820) may be pulled away and resecured multiple times to allow repeated resealing of the label 1800 in the closed position. By providing the hole 1840 larger than the hole 1843, any tendency for the adhesive portion to undesirably adhere to the upper surface of the bottom panel 1810 may be reduced or eliminated.

Figure 28:
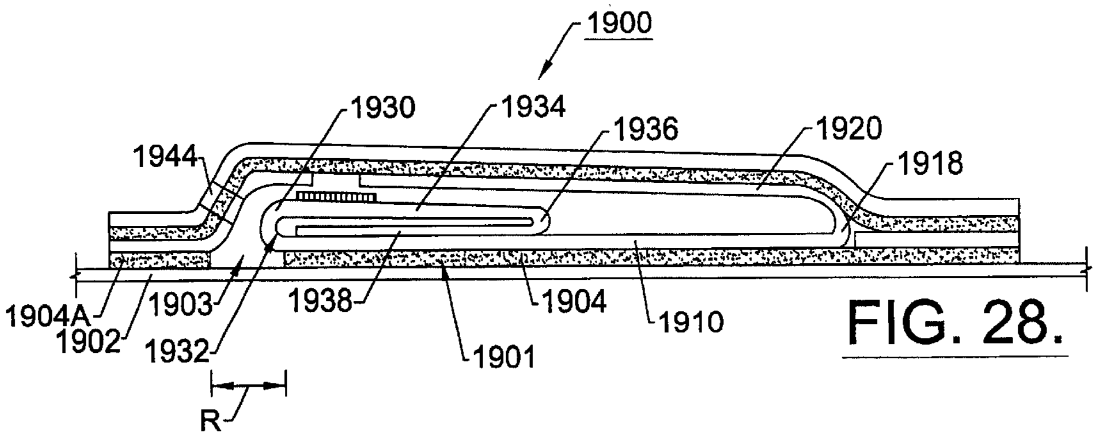
FIG. 28 is a side elevational view of a label according to a further embodiment of the present invention disposed on a release liner.

With reference to FIG. 28, a label 1900 according to a further embodiment is shown therein mounted on a release liner 1902. The label 1900 corresponds to the label 600 (FIG. 13) except as follows. The label 1900 includes a leaflet 1901 similar to the leaflet 101 (FIG. 1A). More particularly, the interior panel 1934 is joined to the bottom panel by a fold 1930 (with a tear line 1932) and is also joined to another interior panel 1938 by a fold 1936. The adhesive-free gap adjacent the fold 1918 between the top panel 1920 and the bottom panel 1910 is eliminated. An adhesive-free gap or zone 1903 is formed between the adjacent edges of the adhesive patch 1904 and a second adhesive patch 1904A. The tear strip 1944 overlies the adhesive-free gap 1903. Preferably, the adhesive-free gap 1903 underlies the entirety of the tear strip 1944 and has a width R of between about ⅛ and ¼ inch. The adhesive-free gap 1903 may be formed by suitably patterning the applied adhesive 1904 as will be apparent to those of ordinary skill in the art upon reading the description herein.

Figure 29:
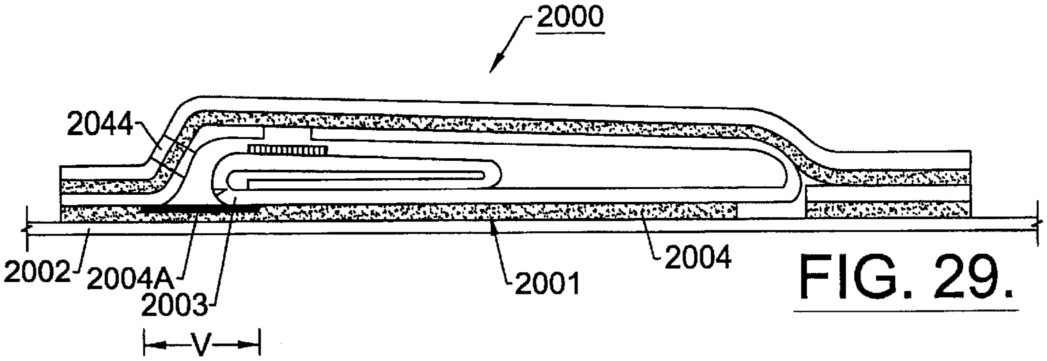
FIG. 29 is a side elevational view of a label according to a further embodiment of the present invention disposed on a release liner.

With reference to FIG. 29, a label 2000 according to a further embodiment is shown therein disposed on a release liner 2002. The label 2000 corresponds to the label 600 (FIG. 13) except as follows. The leaflet 2001 corresponds to the leaflet 1901. A portion 2004A of the adhesive patch 2004 is coated with a strip of varnish or adhesive deadener 2003. The tear strip 2044 overlies the varnish or deadener strip 2003. Preferably, the varnish or deadener strip 2003 underlies the entirety of the tear strip 2044 and has a width V of between about ⅜ and ½ inch. Suitable varnishes or deadeners include Product 800 available from Radcure of Fairfield, N.J. The label 2000 may be formed by applying the varnish or adhesive deadener to the adhesive 2004 prior to applying the leaflet 2001, and means and methods for forming the label 2000 will be readily apparent from the description herein.

It will be appreciated that the labels 500, 600, 1900 and 2000 may be modified to include various of the features and aspects discussed with regard to one another. For example, the label 1900 may include a booklet-style leaflet (e.g., as in the label 600), may be formed without a tab corresponding to the tab 656, and/or may include an adhesive-free gap adjacent the fold 1918. Similarly, the label 2000 may include a booklet-style leaflet (e.g., as in the label 600), may be formed without a tab corresponding to the tab 656, and/or may eliminate the adhesive-free gap adjacent the fold between the top and bottom panels. Each of the labels 500, 600 may include folded leaflets similar to the leaflets 1901, 2001. The separate tabs (e.g., the tab 656) may partially underlap or be spaced apart from the leaflet. The foregoing is non-exhaustive of the combinations of features and aspects which may be employed.

In each of the foregoing labels, the adhesives and varnishes (or leaflet material) providing for resealability (e.g., the adhesives 152A, 552A, 704A, 1204A, and 1404A and the varnishes 142, 542, 742, 1242, and 1442, respectively) are selected such that, when engaged, they resist inadvertent separation during application and handling and require deliberate effort to separate but do not significantly damage (e.g., fiber tear) any portion of the label when being separated. The adhesive 1852 of the label 1800 should be selected such that it cooperates with the intended article surface material in the same manner.

The adhesives and associated varnishes (or article surface material) should be selected such that they provide such properties also after they are re-engaged. The labels as described above are particularly well-suited for application to round containers. Preferably, the labels are applied such that the end nearest the gap in the lower adhesive is applied last.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A label comprising:

a) a bottom panel;

b) a top panel overlying said bottom panel, said top panel including an extended flap extending therefrom and beyond an edge of said bottom panel;

c) a base adhesive patch coating a lower surface of said bottom panel;

d) a flap adhesive patch coating a lower surface of said extended flap;

e) an adhesive-free gap defined between said base adhesive patch and said flap adhesive patch, at least a portion of said adhesive-free gap underlying said extended flap;

f) a tear line formed in said extended flap of said top panel and overlying said adhesive-free gap;

g) a hole formed in at least one of said top and bottom panels; and h) an exposed adhesive disposed in said hole;

i) wherein said label may be opened by tearing along said tear line and said label may be resealed using said exposed adhesive.

2. The label of claim 1 including a release coating on one of said top and bottom panels and positioned to releasably engage said exposed adhesive.

3. The label of claim 1 including a second tear line formed in said top panel, said second tear line being spaced apart from said first tear line to define a tear strip therebetween.

4. The label of claim 1 including a pull tab between said hole and said tear line.

5. The label of claim 1 wherein including an interior panel positioned between said top and bottom panels.

6. The label of claim 1 including:

a laminate cover overlying said top panel; and a laminate adhesive securing said laminate cover to said top panel, said exposed adhesive forming a part of said laminate adhesive;

wherein said hole is formed in said top panel and said exposed adhesive releasably engages an upper surface of said bottom panel.

7. The label of claim 1 including:

an interior panel disposed between said top and bottom panels, said interior panel having an upper surface facing said top panel;

a laminate cover overlying said top panel; and a laminate adhesive securing said laminate cover to said top panel, said exposed adhesive forming a part of said laminate adhesive;

wherein said hole is formed in said top panel and said exposed adhesive releasably engages an upper surface of said interior panel.

8. The label of claim 1 wherein:

said exposed adhesive forms a part of said base adhesive; and said hole is formed in said bottom panel and said exposed adhesive releasably engages a lower surface of said top panel.

9. The label of claim 1 including:

a first hole defined in said bottom panel;

a second hole defined in said top panel and overlying said first hole;

a laminate cover overlying said top panel; and a laminate adhesive securing said laminate cover to said top panel, said exposed adhesive forming a part of said laminate adhesive;

wherein said exposed adhesive is disposed adjacent each of said first and second holes.

10. The label of claim 1 including a laminate cover overlying said top panel, and a laminate adhesive securing said laminate cover to said top panel.

11. The label of claim 1 including:

a laminate cover overlying said top panel;

a laminate adhesive securing said laminate cover to said top panel;

a tab disposed adjacent said bottom panel and separately formed from said top and bottom panels, said tab having an upper surface and a lower surface; and a tab adhesive coating said lower surface of said tab;

wherein said laminate cover is secured to said upper surface of said tab by said laminate adhesive.

12. The label of claim 1 including a second tear line formed in said bottom panel adjacent said first tear line.

13. The label of claim 1 including a release liner, wherein said base adhesive engages and releasably secures said bottom panel to said release liner.

14. The label of claim 1 including a unitary leaflet including said bottom panel and said top panel, wherein said top panel is joined to said bottom panel along a fold.

15. The label of claim 10 wherein said laminate cover includes a marginal portion extending beyond each of said top and bottom panels and coated on an underside thereof by said laminate adhesive.

16. The label of claim 11 wherein said tab is disposed substantially immediately adjacent an end edge of said bottom panel.

17. The label of claim 11 wherein said tab is spaced apart from an end edge of said bottom panel.

18. The label of claim 11 wherein said tab partially underlaps said bottom panel.

19. A label comprising:

a) a bottom panel;

b) a top panel overlying said bottom panel, said top panel including an extended flap extending therefrom and beyond an edge of said bottom panel;

c) a base adhesive coating a lower surface of said bottom panel and a lower surface of said extended flap;

d) a release portion of said base adhesive underlying said extended flap, said release portion being coated with at least one of an adhesive deadener and a varnish;

e) a tear line formed in said extended flap of said top panel and overlying said release portion;

f) a hole formed in at least one of said top and bottom panels; and g) an exposed adhesive disposed in said hole;

h) wherein said label may be opened by tearing along said tear line and said label may be resealed using said exposed adhesive.

20. The label of claim 19 including a release coating on one of said top and bottom panels and positioned to releasably engage said exposed adhesive.

21. The label of claim 19 including a second tear line formed in said top panel, said second tear line being spaced apart from said first tear line to define a tear strip therebetween.

22. The label of claim 19 including a pull tab between said hole and said tear line.

23. The label of claim 19 wherein including an interior panel positioned between said top and bottom panels.

24. The label of claim 19 including:

a laminate cover overlying said top panel; and a laminate adhesive securing said laminate cover to said top panel, said exposed adhesive forming a part of said laminate adhesive;

wherein said hole is formed in said top panel and said exposed adhesive releasably engages an upper surface of said bottom panel.

25. The label of claim 19 including:

an interior panel disposed between said top and bottom panels, said interior panel having an upper surface facing said top panel;

a laminate cover overlying said top panel; and a laminate adhesive securing said laminate cover to said top panel, said exposed adhesive forming a part of said laminate adhesive;

wherein said hole is formed in said top panel and said exposed adhesive releasably engages an upper surface of said interior panel.

26. The label of claim 19 wherein:

said exposed adhesive forms a part of said base adhesive; and said hole is formed in said bottom panel and said exposed adhesive releasably engages a lower surface of said top panel.

27. The label of claim 19 including:

a first hole defined in said bottom panel;

a second hole defined in said top panel and overlying said first hole;

a laminate cover overlying said top panel; and a laminate adhesive securing said laminate cover to said top panel, said exposed adhesive forming a part of said laminate adhesive;

wherein said exposed adhesive is disposed adjacent each of said first and second holes.

28. The label of claim 19 including a laminate cover overlying said top panel, and a laminate adhesive securing said laminate cover to said top panel.

29. The label of claim 19 including:

a laminate cover overlying said top panel;

a laminate adhesive securing said laminate cover to said top panel;

a tab disposed adjacent said bottom panel and separately formed from said top and bottom panels, said tab having an upper surface and a lower surface; and a tab adhesive coating said lower surface of said tab;

wherein said laminate cover is secured to said upper surface of said tab by said laminate adhesive.

30. The label of claim 19 including a second tear line formed in said bottom panel adjacent said first tear line.

31. The label of claim 19 including a release liner, wherein said base adhesive engages and releasably secures said bottom panel to said release liner.

32. The label of claim 19 including a unitary leaflet including said bottom panel and said top panel, wherein said top panel is joined to said bottom panel along a fold.

33. The label of claim 28 wherein said laminate cover includes a marginal portion extending beyond each of said top and bottom panels and coated on an underside thereof by said laminate adhesive.

34. The label of claim 29 wherein said tab is disposed substantially immediately adjacent an end edge of said bottom panel.

35. The label of claim 29 wherein said tab is spaced apart from an end edge of said bottom panel.

36. The label of claim 29 wherein said tab partially underlaps said bottom panel.

* * * * *